United States Patent
Sasaki

(10) Patent No.: US 6,317,288 B1
(45) Date of Patent: Nov. 13, 2001

(54) THIN-FILM MAGNETIC HEAD AND METHOD OF MANUFACTURING SAME

(75) Inventor: Yoshitaka Sasaki, Yokohama (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/220,703

(22) Filed: Dec. 24, 1998

(30) Foreign Application Priority Data

Aug. 28, 1998 (JP) .................................................. 10-243941
Aug. 28, 1998 (JP) .................................................. 10-243942
Dec. 7, 1998 (JP) .................................................. 10-346961

(51) Int. Cl.$^7$ .................................................. G11B 5/147
(52) U.S. Cl. .................................................. 360/126; 360/317
(58) Field of Search .................................................. 360/317, 126

(56) References Cited

U.S. PATENT DOCUMENTS 5,438,747   8/1995   Krounbi et al. .

FOREIGN PATENT DOCUMENTS 60-10409    1/1985   (JP) .
62-245509   10/1987  (JP) .
7-262519    10/1995  (JP) .

OTHER PUBLICATIONS

U.S. application No. 09/282,183, Sasaki, filed Mar. 31, 1999.

*Primary Examiner*—A. J. Heinz
(74) *Attorney, Agent, or Firm*—Oliff & Berridge, PLC

(57) ABSTRACT

It is an object to provide a thin film magnetic head which can precisely control a throat height of a recording head. A bottom pole of the recording head is divided into a bottom pole tip and a bottom pole layer, and the bottom pole tip is formed having a convex shape on a flat surface of the bottom pole layer. Insulating layers formed with inorganic materials, along with a first layer of the thin film coil are buried in a concave region between the bottom pole tip and a bottom connecting portion. The throat height is determined by an edge frame (that is, an edge frame of the opposite side of a track surface of the bottom pole tip) of a bottom-pole-tip side of the insulating layers. As a result, unlike a photoresist film of a related art, a pattern shift of the edge frame and deterioration of profile can be avoided, and the throat height can be precisely controlled.

24 Claims, 21 Drawing Sheets

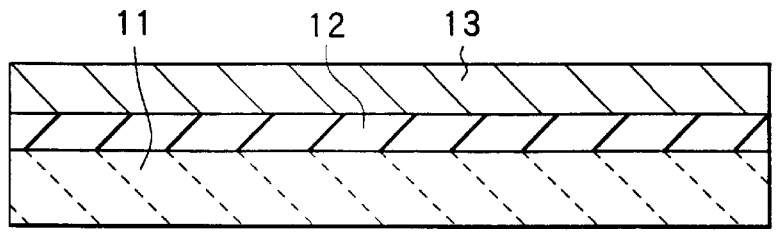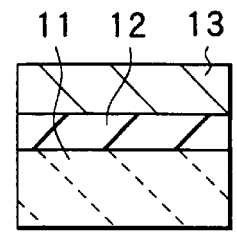
FIG.1A  FIG.1B
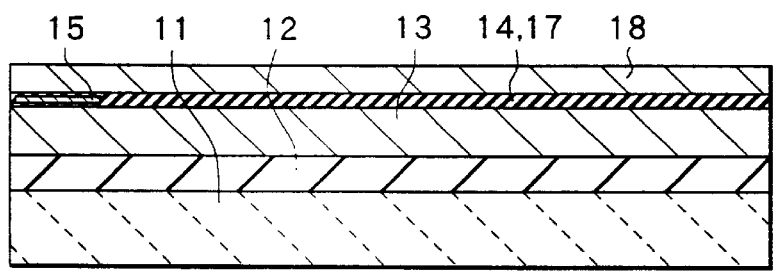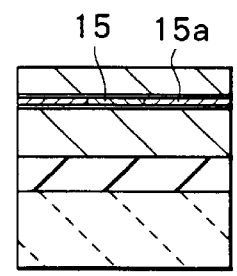
FIG.2A  FIG.2B
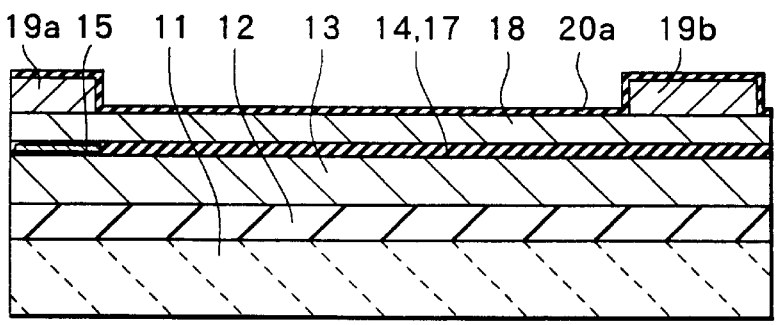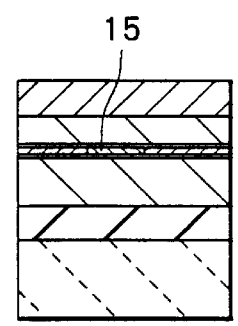
FIG.3A  FIG.3B

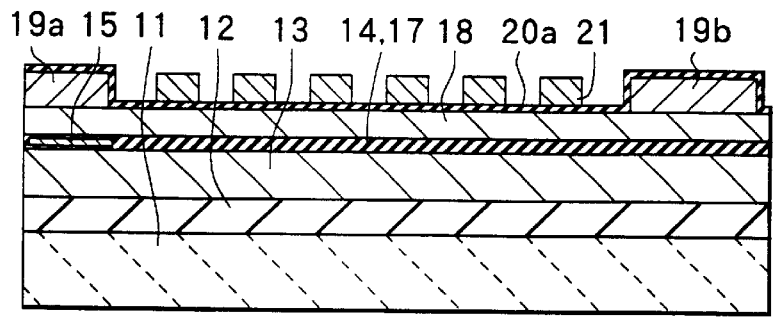
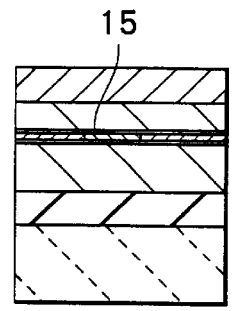
FIG.4A          FIG.4B
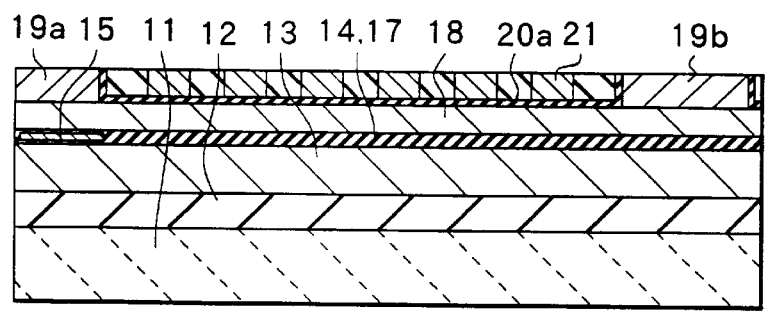
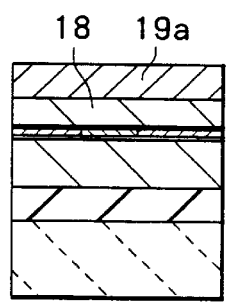
FIG.5A          FIG.5B
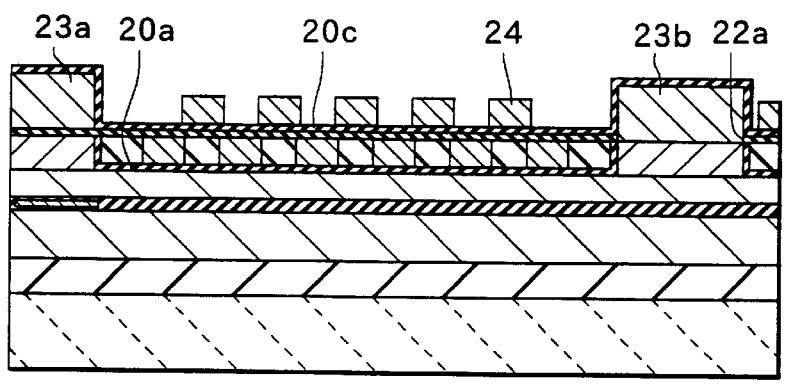
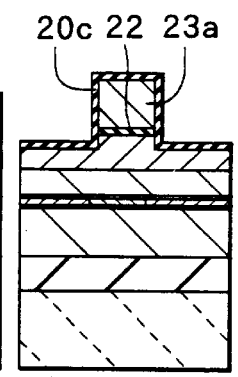
FIG.6A          FIG.6B

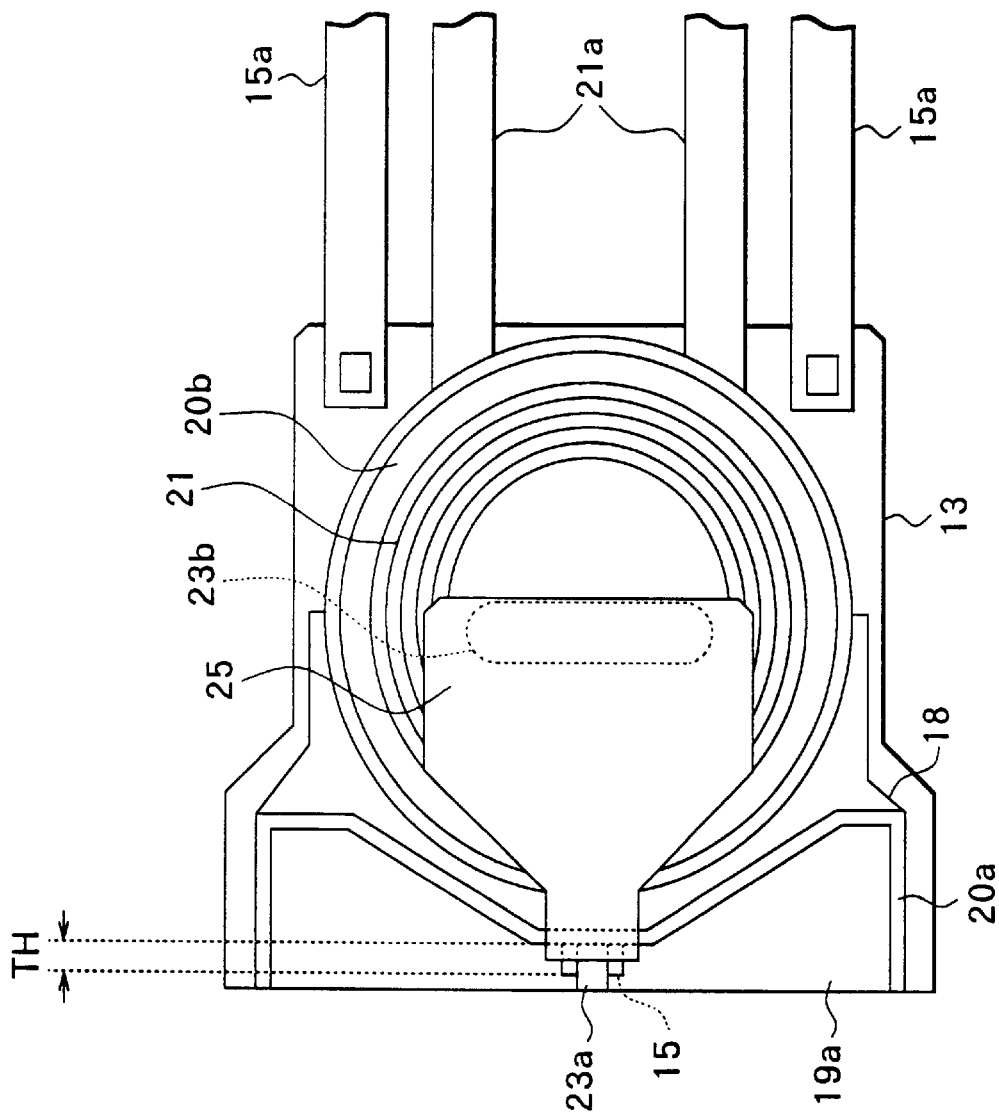

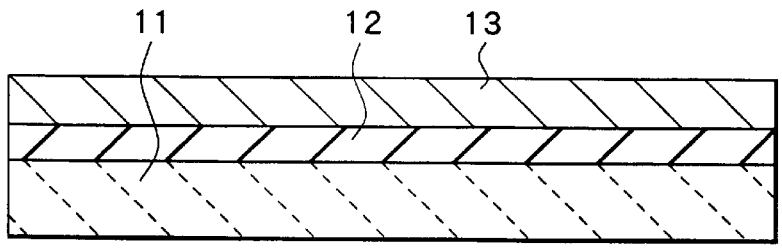
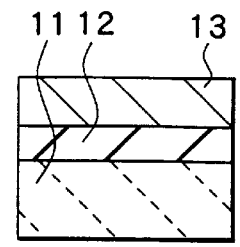
FIG.19A
FIG.19B
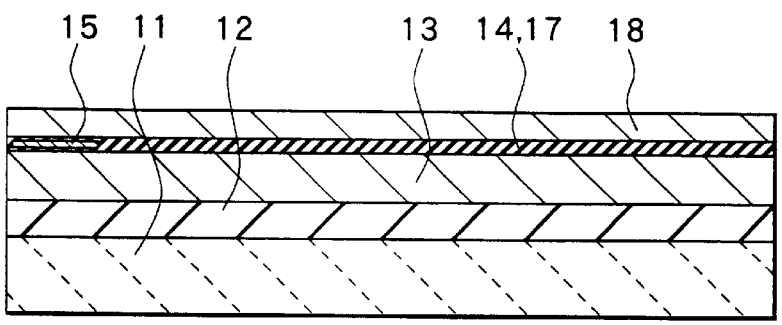
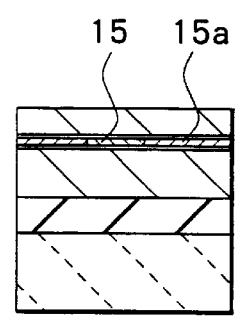
FIG.20A
FIG.20B
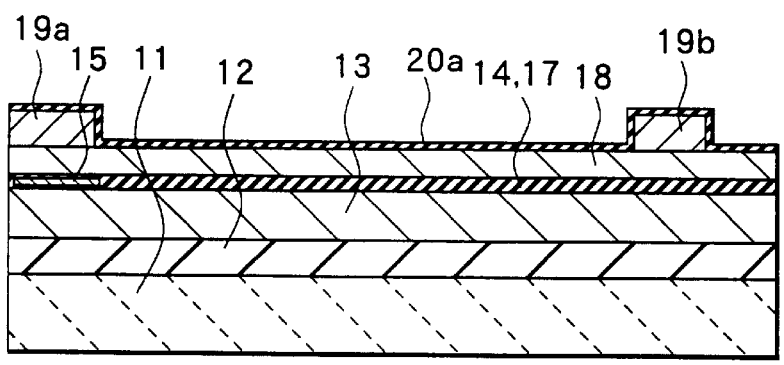
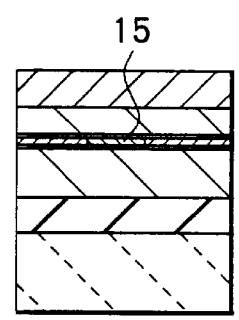
FIG.21A
FIG.21B

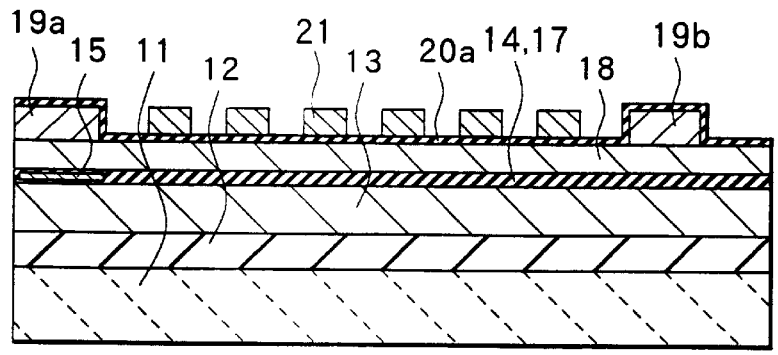 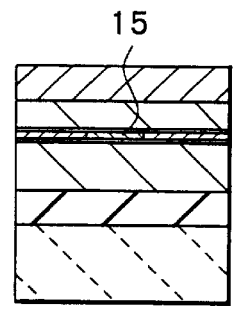
FIG.22A  FIG.22B
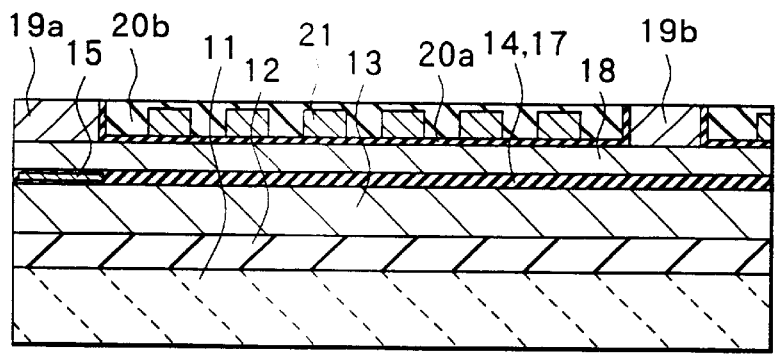 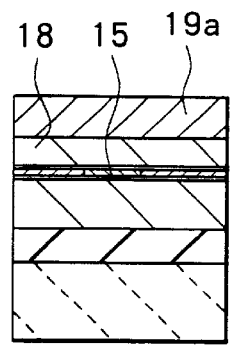
FIG.23A  FIG.23B
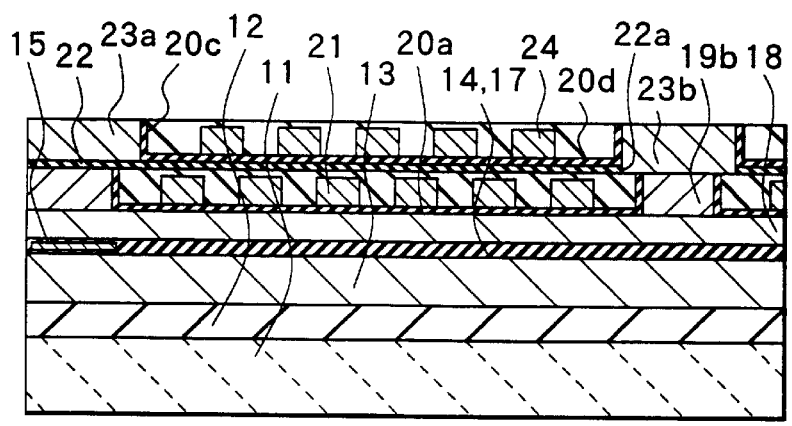 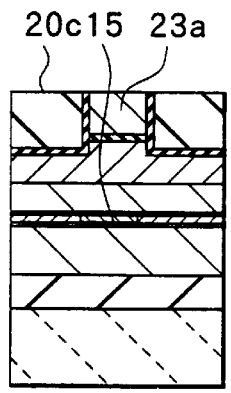
FIG.24A  FIG.24B

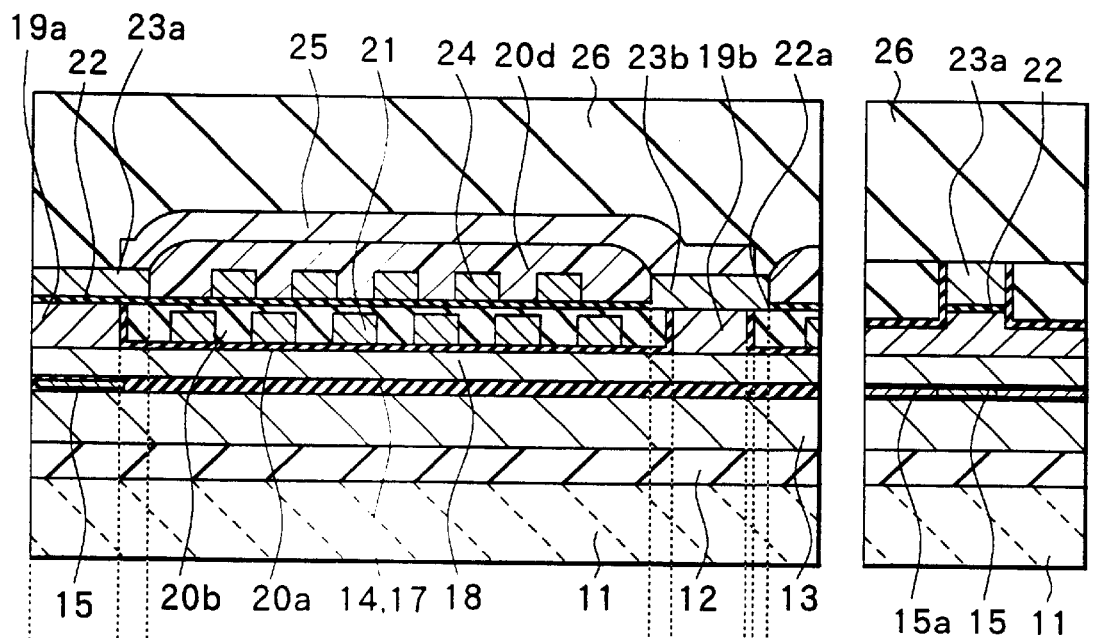
FIG.28A
FIG.28B
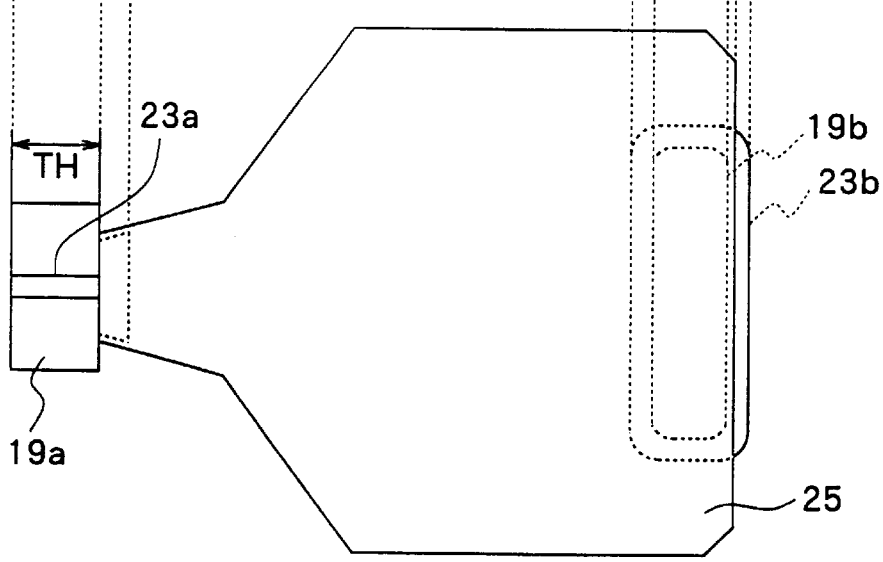
FIG.28C

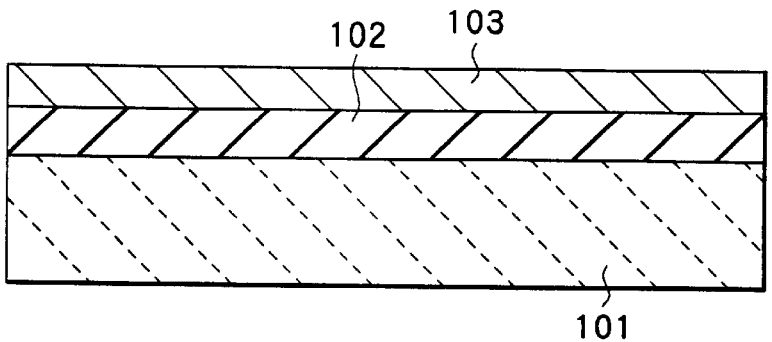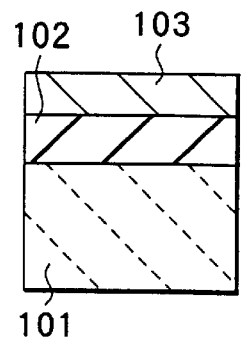
FIG.31A  FIG.31B
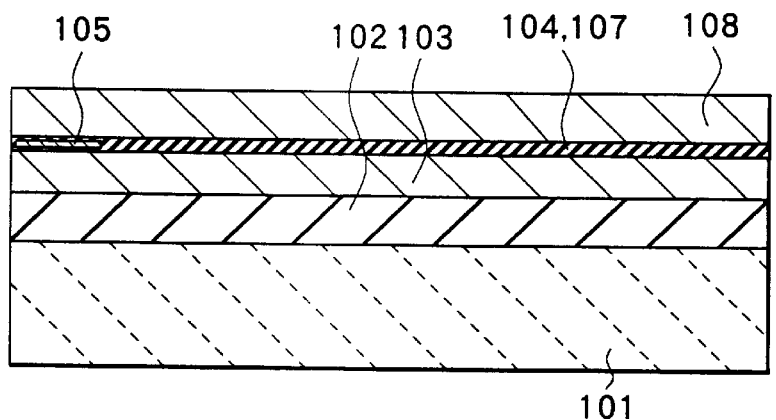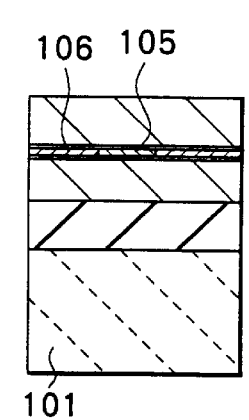
FIG.32A  FIG.32B
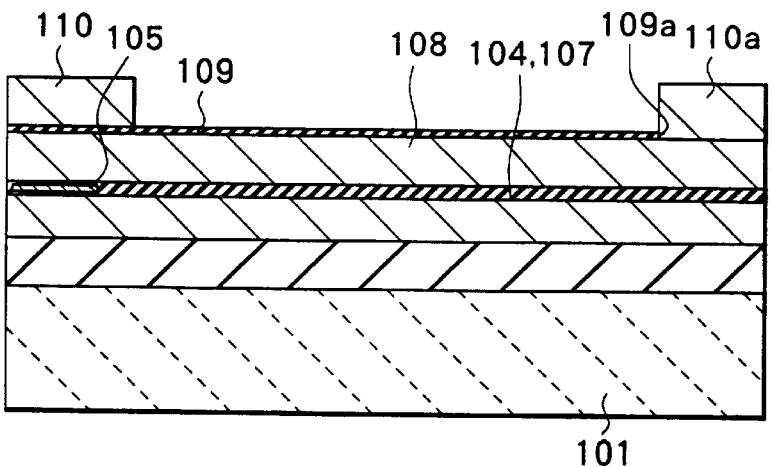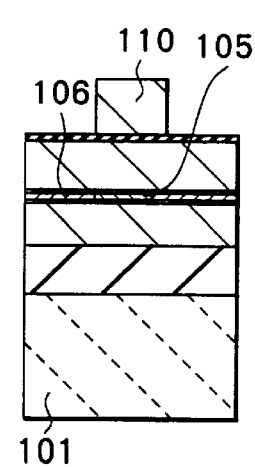
FIG.33A  FIG.33B

THIN-FILM MAGNETIC HEAD AND METHOD OF MANUFACTURING SAME

BACKGROUND OF THE INVENTION

1. Field of the Invention

The present invention relates to a thin film magnetic head having at least an inductive-type magnetic transducer for writing and a method of manufacturing the same.

2. Description of the Related Art

Performance improvement in thin film magnetic heads has been sought in accordance with an increase in surface recording density of a hard disk device. A composite thin film magnetic head, which is made of a layered structure including a recording head having an inductive-type magnetic transducer for writing and a reproducing head having magnetoresistive (MR) elements for reading, is widely used as a thin film magnetic head. The MR elements includes an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using the GMR element is called a GMR head. The AMR head is used as a reproducing head whose surface recording density is more than 1 gigabit per square inch. The GMR head is used as a reproducing head whose surface recording density is more than 3 gigabit per square inch.

In general, an AMR film is made of a magnetic substance that exhibits the MR effect and has a single-layered structure. In contrast, most of GMR films have a multi-layered structure consisting of a plurality of films. There are several types of mechanisms which produces the GMR effect. The layer structure of a GMR film depends on the mechanism. The GMR films include a super-lattice GMR film, a spin valve film, a granular film and so on, while the spin valve film is most efficient as the GMR film which has a relatively simple structure, exhibits a great change in resistance in a low magnetic field, and is suitable for mass reproduction.

As a primary factor for determining the performance of a reproducing head, there is a pattern width, especially an MR height. The MR height is the length (height) between the end of an MR element closer to an air bearing surface and the other end. The MR height is originally controlled by an amount of grinding when the air bearing surface is processed. The air bearing surface (ABS) here is a surface of a thin film magnetic head that faces a magnetic recording medium and is also called a track surface.

Performance improvement in a recording head has also been expected in accordance with the performance improvement in a reproducing head. It is required to increase the track density of a magnetic recording medium in order to increase the recording density among the performance of a recording head. In order to achieve this, a recording head of a narrow track structure in which the width of a bottom pole and a top pole sandwiching a write gap on the air bearing surface is required to be reduced to the order of some microns to submicron. Semiconductor process technique is used to achieve the narrow track structure.

Another factor determining the performance of a recording head is the throat height (TH). The throat height is the length (height) of a portion (magnetic pole portion) which is from the air bearing surface to an edge of an insulating layer which electrically isolates the thin film coil. Reducing the throat height is desired in order to improve the performance of a recording head. The throat height is controlled as well by an amount of grinding when the air bearing surface is processed.

In order to improve the performance of a thin film magnetic head, it is important to form the recording head and the reproducing head as described in well balance.

Here, an example of a manufacturing method of a composite thin film magnetic head as an example of a thin film magnetic head of a related art is to be described with reference to FIGS. 31A and 31B to FIGS. 36A and 36B.

As shown in FIGS. 31A and 31B, an insulating layer 102 made of, for example, alumina (aluminum oxide, $Al_2O_3$) of about 5 to 10 μm in thickness is formed on a substrate 101 made of, for example, aluminum oxide and titanium carbide ($Al_2O_3 \cdot TiC$). Further, a bottom shield layer 103 for a reproduction head made of, for example, permalloy (NiFe) is formed on the insulating layer 102.

Next, as shown in FIGS. 32A and 32B, for example, alumina of about 100~200 nm in thickness is deposited on the bottom shield layer 103 to form a shield gap film 104. Then, an MR film 105 of tens of nanometers in thickness for making up the MR element for reproduction is formed on the shield gap film 104, and photolithography with high precision is applied to obtain a desired shape. Next, a lead terminal layer 106 facing the MR film 105 is formed by lift-off method. Next, a shield gap film 107 is formed on the shield gap film 104, the MR film 105 and the lead terminal layer 106, and the MR film 105 and the lead terminal layer 106 are buried in the shield gap layers 104 and 107. Next, a top shield-cum-bottom pole (called bottom pole in the followings) 108 of about 3 μm in thickness made of, for example, permalloy (NiFe), which is a material used for both of a reproduction head and a recording head, is formed on the shield gap film 107.

Next, as shown in FIGS. 33A and 33B, a write gap layer 109 of about 200 nm in thickness made of an insulating layer such as an alumina film is formed on the bottom pole 108. Further, an opening 109a for connecting the top pole and the bottom pole is formed through patterning the write gap layer 109 by photolithography. Next, a pole tip 110 is formed with magnetic materials made of permalloy (NiFe) and nitride ferrous (FeN) through plating method, while a connecting portion pattern 110a of the top pole and the bottom pole is formed. The bottom pole 108 and a top pole layer 116 which is to be described later are connected by the connecting pattern 110a and so that forming a through hole after CMP (Chemical and Mechanical Polishing) procedure which is to be described later becomes easier.

Next, as shown in FIGS. 34A and 34B, the write gap layer 109 and the bottom pole 108 are etched about 0.3~0.5 μm by ion milling having the pole tip 110 as a mask. By etching the bottom pole 108, a trim structure is formed. As a result, widening of effective write track width can be avoided (that is, suppressing widening of magnetic flux at the bottom pole when data is being written). Next, after an insulating layer 111 of about 3 μm, made of, for example, alumina is formed all over the surface, the whole surface is flattened by CMP.

Next, as shown in FIGS. 35A and 35B, a first layer of a thin film coil 112 for inductive-type recording heads made of, for example, copper (Cu) is selectively formed on the insulating layer 111 by, for example, plating method. Further, a photoresist film 113 is formed in a desired pattern on the insulating layer 111 and the thin film coil 112 by photolithography with high precision. Further, a heat treatment of desired temperature is applied for flattening the photoresist film 113 and insulating between the thin film coils 112. Likewise, a second layer of a thin film coil 114 and a photoresist film 115 are formed on the photoresist film 113, and a heat treatment of desired temperature is applied for flattening the photoresist film 115 and insulating between the thin film coils 114.

Next, as shown in FIGS. 36A and 36B, a top pole yoke-cum-top pole layer (called a top pole layer in the followings) 116 made of, for example, permalloy, which is a magnetic material for recording heads, is formed on the top pole 110, the photoresist films 113 and 115. The top pole layer 116 has a contact with the bottom pole 108 in a position rear of the thin film coils 112 and 114, and is magnetically coupled to the bottom pole 108. Further, an over coat layer 117 made of, for example, alumina is formed on the top pole layer 116. At last, a track surface (air bearing surface) of recording heads and reproducing heads is formed through a slider machine processing, and a thin film magnetic head is completed.

In FIGS. 36A and 36B, TH represents the throat height and MR-H represents the MR height. Further, P2W represents the track (magnetic pole) width.

As an factor for determining the performance of a thin film magnetic head, there is an apex angle as represented by θ in FIG. 36A besides the throat height TH and the MR height MR-H and so on. The apex angle is an angle between a line connecting the corner of a side surface of the track surface of the photoresist films 113, 115 and an upper surface of the top pole layer 116.

To improve the performance of a thin film magnetic head, it is important to form the throat height TH, the MR height MR-H and the apex angle θ as shown in FIG. 36A precisely.

Especially these days, for enabling high surface density writing, that is to form a recording head with a narrow track structure, submicron measurement of equal to or less than 1.0 μm is required for the track width P2W. For that, a technique for processing the top pole to submicron using a semiconductor processing technique is required. Further, utilizing magnetic materials which has high saturation magnetic flux density for the magnetic pole is desired following the implementation of the narrow track structure.

Here, the problem is that it is difficult to precisely form the top pole layer 116 on a coil area (apex area) being protruded like a mountain covered with photoresist films (for example, the photoresist films 113,115 shown in FIG. 36A).

As a method of forming the top pole, frame plating method, shown in, for example, Japanese Patent Application laid-open in Hei 7-262519, is used. When the top pole is formed by the frame plating method, first, a thin electrode film made of, for example, permalloy is formed all over the apex area. Next, photoresist is applied on it, and by patterning it through photolithography, a frame for plating is formed. Further, the top pole is formed through plating method having the electrode film formed earlier as a seed layer.

By the way, the apex area and other areas have, for example, equal to or more than 7 to 10 μm differences in heights. If the film thickness of the photoresist formed on the apex area is required to be equal to or more than 3 μm, a photoresist film of equal to or more than 8 to 10 μm in thickness is formed in the lower part of the apex area since the photoresist with liquidity gathers into a lower area. To form a narrow track as described, a pattern with submicron width is required to be formed with a photoresist film. Accordingly, forming a micro pattern with submicron width with a photoresist film of equal to or more than 8 to 10 μm in thickness is required. However, it has been extremely difficult.

Further, during an exposure of photolithography, a light for the exposure reflects by an electrode film made of, for example, permalloy, and the photoresist is exposed also by the reflecting light causing deformation of the photoresist pattern. As a result, the top pole can not be formed in a desired shape and so on since side walls of the top pole take a shape of being rounded. As described, with a related art, it has been extremely difficult to precisely control the track P2W and to precisely form the top pole so as to implement a narrow track structure.

For the reasons described above, as shown in a procedure of an example of a related art in FIGS. 33A and 33B~36A and 36B, a method of connecting the pole tip 110 and a yoke area-cum-top pole layer 116 after forming a track width of equal to or less than 1.0 μm with the pole tip 110 which is effective for forming a narrow track of a recording head, that is, a method of dividing the regular top pole into the pole tip 110 for determining the track width and the top pole layer 116 which becomes the yoke area for inducing magnetic flux is employed (Ref. Japanese Patent Application laid-open Sho 62-245509, Sho 60-10409). By dividing the top pole into two as described, the pole tip 110 can be fine-processed to submicron width on a flat surface of the write gap layer 109.

However, there still exists problems as follows regarding the thin film magnetic head.

(1) First, in the magnetic head of a related art, the throat height is determined in an edge of a further side from the track surface 118 of the pole tip 110. However, if the width of the pole tip 110 becomes narrower, a pattern edge is formed being rounded by photolithography. As a result, the throat height which is required to have a highly precise measurement becomes inhomogeneous, which leads to a state where the throat height and the track width of magnetoresistive element becomes unbalanced in a procedure of processing and polishing the track surface. For example, when 0.5~0.6 μm of the track width is needed, a problem in which an edge of a further side from the track surface 118 of the pole tip 110 is shifted from the throat height 0 position to the track surface 118 side and writing gap is widely opened, often causing a problem in which writing of recording data can not be performed.

(2) Next, as described above, in the magnetic head of a related art, it is not required to fine-process the top pole layer 116 as precise as the pole tip 110, since the track width of the recording head is determined by the pole tip 110 of the divided top pole. However, since the location of the top pole layer 116 is determined in the upper area of the pole tip 110 by positioning of photolithography, if both are largely shifted to one side when looking at the structure from the track surface 118 (FIG. 36A) side, so-called side write for performing writing on the top pole layer 116 side occurs. As a result, the effective track width becomes wider and a problem that writing is performed in a region other than the originally designated data recording region in a hard disk occurs.

Further, when the track width of the recording head becomes extremely finer, especially equal to or less than 0.5 μm, a process precision of submicron width is required in the top pole layer 116. That is, if the measurement difference in a lateral direction of the pole tip 110 and the top pole layer 116 is too significant when looking at it from the track surface 118 side, as described above, a side write occurs and a problem that writing is performed in a region other than the originally designated data recording region in a hard disk occurs.

As a result, not only the pole tip 110 but also the top pole layer 116 is required to be processed to the submicron width, however, it is difficult to perform fine-process of the top pole layer 116 since there is a significant difference in heights as described above in the apex area under the top pole layer 116.

(3) Further, in the magnetic head of a related art, there is a problem that it is difficult to shorten a yoke length. That is, the narrower the coil pitch becomes, the easier the achievement of a head with short yoke length becomes and, especially, a recording head with a high frequency characteristics can be formed. However, when the coil pitch is made indefinitely small, the length of outer periphery end of the coil becomes a main factor for preventing the yoke length from shortening for the position of the throat height 0. The yoke length can be made shorter with two-layered coil than one-layered coil so that most of the recording heads for high frequency employ the two-layered coil. However, in the magnetic head of a related art, after forming a first layer of coil, a photoresist film of about 2 $\mu$m is formed in order to form an insulating film between the coils. As a result, a small apex area having a rounded shape is formed in the outer peripheral end of the first layer of the coil. Next, a second layer of the coil is to be formed on it, however, etching to have a seed layer can not be performed in the slope of the apex area causing the coil to short-circuit, which makes it impossible to form the second layer of the coil. Accordingly, the second layer of the coil needs to be formed on a flat area. When the slope of the apex is 45~55°, if the thickness of the coil is 2~3 $\mu$m and the thickness of the insulating film between the coils is 2 $\mu$m, 8~10 $\mu$m which is twice of 4~5 $\mu$m, (the distance from the contact area of the top pole and the bottom pole to the outer peripheral end of the coil also needs to be 4~5 $\mu$m) the distance from the outer peripheral end of the coil to the vicinity of the throat height 0 position is needed. This has been the main factor for preventing the yoke length from reducing. For example, when forming two layers of coils with 11 turns with line/space being 1.0 $\mu$m/1.0 $\mu$m, suppose the first layer is 6 turns and the second layer is 5 turns, then, the length of the coil of the yoke length is 11 $\mu$m. Here, since 8~10 $\mu$m is required in the apex area of the outer peripheral end, reduction of the yoke length to equal to or less than 19~21 $\mu$m is impossible. This has prevented the high frequency characteristics from improving.

SUMMARY OF THE INVENTION

The invention is presented to solve these problems. The first object is to provide a thin film magnetic head which can precisely control the throat height in the recording head and a method of manufacturing the same.

Further, the second object is to provide a thin film magnetic head, which can fine-process the submicron width of the top pole layer in addition to the precise control of the throat height, whose characteristic of the recording head is improved, and a method of manufacturing the same.

Further, the third object is, in addition to the precise control of the throat height, to provide a thin film magnetic head which can reduce the yoke length of the recording head and whose high frequency characteristic is improved, and a method of method of manufacturing the same.

A thin film magnetic head of the invention has at least two magnetic layers which includes a first magnetic pole and a second magnetic pole being magnetically connected to each other, part of sides of which facing a recording medium face each other through a write gap layer, and one or more than two layers of thin film coil for generating magnetic flux. The thin film magnetic head comprises a first magnetic layer, a first pole formed being divided from the first magnetic layer, while the opposite surface of a neighboring surface of the write gap layer being magnetically coupled to part of region of the first magnetic layer, a second magnetic layer including the second magnetic pole, and an insulating layer formed with inorganic materials, and formed extendedly at least from a surface of the first magnetic pole which is opposite of a side facing the recording medium to one of the surfaces of the first magnetic layer.

In the thin film magnetic head of the invention, as the first pole is formed to be divided from the first magnetic layer and to have convex shape against the first magnetic layer, the insulating layer made of an inorganic material is formed adjacent to the first magnetic pole. Accordingly, a phenomenon (protrusion) in which a track pole (top pole or pole tip) sticks out to ABS by thermal expansion generated during operation on the hard disk can be suppressed to minimum. Further, the throat height of the recording head portion is precisely determined by making the length of the first magnetic pole from the surface facing the recording medium towards inner direction equal to the length of the throat height of the recording head. Further, by burying the thin film coil in a region in which the insulating layer is formed, the step of the apex area including the coil becomes lower comparing to that of a related art. As a result, when forming the second magnetic pole by photolithography technique, difference in the thickness of photoresist film on the top and the bottom of the apex area is decreased. Accordingly, micronizing the submicron measurement of the second magnetic pole can be achieved.

A thin film magnetic head of the invention can be further achieved with the embodiments in the followings in addition to the structures described above.

That is, in the thin film magnetic head of the invention, the length from a surface of the first magnetic pole facing the recording medium is preferable to be equal to the length of the throat height of the recording head. Further, a structure in which at least part of a film-thickness direction of, at least, a layer of the thin film coil is formed to be placed in a region where the insulating layer is formed is preferable.

Further, in the thin film magnetic head of the invention, the insulating layer may include a first insulating layer being extendedly formed from a surface of the first magnetic pole which is opposite of a side facing the recording medium to one of a surface of the magnetic layer, and a second insulating layer being formed at least between windings of the thin film coil. Further, a surface of the insulating layer which is opposite of a neighboring surface of the first magnetic layer may be formed to be the same surface substantially as a surface of the first magnetic pole which is opposite of a neighboring surface of the write gap layer.

Further, in the thin film magnetic head of the invention, the second magnetic pole may be formed being divided from the second magnetic layer, and may be magnetically coupled to the second magnetic layer in, at least, part of a surface of an opposite side of a neighboring surface of the write gap layer.

Further, in the thin film magnetic head of the invention, width of the first magnetic pole along a surface facing the recording medium may be formed to be wider than width of the second magnetic pole.

Further, in the thin film magnetic head of the invention, the second magnetic pole may be formed in the same length as the first magnetic pole from the surface facing the recording medium to the inner side.

Further, the length of the second magnetic pole may be formed longer than that of the first magnetic pole. With such a structure, the contact area of the second magnetic pole and the second magnetic layer can be sufficiently maintained and magnetic coupling of the second magnetic pole and the second magnetic layer be better performed.

Further, the thin film magnetic head of the invention may comprise a first connecting portion formed adjacent to the first magnetic layer in the vicinity of an edge of the second magnetic layer which is an opposite side of a side facing the recording medium, and a second connecting portion formed adjacent to the second magnetic layer in a place facing the first connecting portion. Further, the areas of the first connecting portion and the second connecting portion facing each other may be different. Preferably, the area of the second connecting portion is formed larger than that of the first connecting portion.

Further, in the thin film magnetic head of the invention, the second magnetic layer is preferably formed in a place which is recessed from a surface facing the recording medium.

Further, in the thin film magnetic head of the invention, the first insulating layer may be formed along surfaces of both sides of the first magnetic pole except for an edge surface of a side facing the recording medium.

Further, in the thin film magnetic head of the invention, the whole part of film-thickness direction of the thin film coil may be formed in a region where the first insulating layer is formed. Further, a surface of the thin film coil which is opposite of a neighboring surface of the first insulating layer may be formed to be substantially the same surface as a neighboring surface of the first magnetic pole with the write gap layer.

Further, in the thin film magnetic head of the invention, the second insulating layer may be formed to be substantially the same surface as a neighboring surface of the first magnetic pole with the write gap layer.

Further, in the thin film magnetic head of the invention, a surface of the second magnetic layer, which is on the opposite side of the facing surface of the write gap layer, may be flat. Further, the thin film coil may be buried in the insulating layer and, the surface of the second magnetic layer, which is in the opposite side of the facing surface of the write gap layer may be made flat.

Further, in the thin film magnetic head of the invention, one of the surfaces of the write gap layer may be formed to cover the second insulating layer and the thin film coil. Further, a third magnetic layer may be, at least, formed extendedly from a surface of the second magnetic pole which is opposite of a side facing the recording medium to other surface of the write gap layer. Further, the thin film magnetic head may have a structure, which comprises at least one layer of thin film coil formed being covered with other insulating layer which is different from the first to the third insulating layers, between the third insulating layer and the second magnetic layer. Further, the third insulating layer and other insulating layer may be formed to be substantially the same surface with a surface of the second magnetic pole which is opposite of a neighboring surface of the write gap layer.

Further, in the thin film magnetic head of the invention, the width of the second magnetic pole which is on the opposite-surface side of a side facing the recording medium may be formed to be wider than the width of a side facing the recording medium. A surface of the first magnetic pole which is opposite of a side facing the recording medium may be formed to incline towards the first magnetic layer.

Further, the thin film magnetic head of the invention may be formed to comprise a magnetoresistive element for reading out.

A method of manufacturing a thin film magnetic head of the invention includes: a step of forming a first magnetic pole on the first magnetic layer so as to be magnetically coupled to part of a region of the first magnetic layer after forming the first magnetic layer; a step of forming an insulating layer with inorganic materials extendedly, at least, from a surface of the first magnetic pole which is the opposite of a side facing the recording medium to one of the surfaces of the first magnetic layer; and a step of forming a second magnetic layer including the second magnetic pole, at least, after forming a write gap layer on the first magnetic pole.

In a method of manufacturing a thin film magnetic head of the invention, the first magnetic pole is formed having a convex shape against the first magnetic layer, and an insulating layer made of an inorganic material is formed adjacent to the first magnetic pole. As a result, the throat height can be determined precisely by making the length of the first pole from the facing surface of the recording medium to the inner direction equal to the length of the throat height of the recording head.

A method of manufacturing a thin film magnetic head of the invention can be further achieved with the embodiments in the followings in addition to the structures described above.

That is, a method of manufacturing a thin film magnetic head of the invention may include a step in which at least part of a film-thickness direction of, at least, a layer of the thin film coil is formed to be placed in a region where the insulating layer is formed.

Further, a method of manufacturing a thin film magnetic head of the invention may include a step of forming insulating layers extendedly from a surface of the first magnetic pole which is opposite of a side facing the recording medium to one of the surfaces of the first magnetic layer, and a step of forming a second insulating layer, at least, between windings of the thin film coil.

Further, a method of manufacturing a thin film magnetic head of the invention may include a step of flattening a surface of the second insulating layer which is the opposite of a neighboring surface of the first magnetic layer so as to make it substantially the same surface as a surface of the first magnetic pole which is the opposite of a neighboring surface of the write gap layer.

Further, a method of manufacturing a thin film magnetic head of the invention may include a step of forming the second magnetic layer so as to be magnetically coupled to, at least, part of the first magnetic pole after forming the second magnetic pole on the write gap layer.

Moreover, the length of the second magnetic pole may be longer than that of the first magnetic pole. Further, in the vicinity of the edge of the second magnetic layer, which is in the opposite side of the facing side of the recording medium, the thin film magnetic head may comprise the first connecting portion formed adjacent to the first magnetic layer, and the second magnetic layer formed adjacent to the second magnetic layer in a position facing the first connecting portion. Further, the area of sides facing each other of the respective first connecting portion and the second connecting portion may be formed different.

Further, in a method of manufacturing a thin film magnetic head of the invention, the width of the first magnetic pole along a surface which is facing the recording medium may be formed to be wider than that of the second magnetic pole.

Further, in a method of manufacturing a thin film magnetic head of the invention, the whole part of a film-thickness direction of the thin film coil may be formed in a region where the first insulating layer is formed.

Further, in a method of manufacturing a thin film magnetic head of the invention, after flattening the second insulating layer, a write gap layer may be formed on the second insulating layer; after forming the second magnetic pole on the write gap layer, a third insulating layer may be formed at least on the write gap layer; then, at least one layer of thin film coil may be formed on the third insulating layer on the write gap layer; and the thin film coil is covered with other insulating layer which is different from the first to third insulating layers.

Further, in a method of manufacturing a thin film magnetic head of the invention, after forming the other insulating layer with inorganic materials, the other insulating layer may be flattened so that its surface forms the same surface with the surface of the second magnetic pole and, then, the second magnetic layer may be formed on the second magnetic pole and the other insulating layer being flattened or after selectively forming the other insulating layer with organic materials, the second magnetic layer may be formed on the second magnetic pole and the other insulating layer.

Further, in a method of manufacturing a thin film magnetic head of the invention, a surface of the second magnetic layer which is an opposite-side of a facing surface of the write gap layer may be formed to be flat. Further, the thin film coil may be buried in a region where the insulating layers are formed, and a surface of the second magnetic layer, which is in an opposite-side of a facing surface of the write gap layer may be flattened.

Further, a method of manufacturing a thin film head of the invention may include a step of forming a magneto resistive element for reading out.

Other objects, characteristics and effects of the invention will be made evident in the following description.

BRIEF DESCRIPTION OF THE DRAWINGS

FIGS. 1A and 1B are cross sections for describing a manufacturing procedure of a thin film magnetic head according to a first embodiment of the invention.

FIGS. 2A and 2B are cross sections for describing the procedure following FIG. 1.

FIGS. 3A and 3B are cross sections for describing the procedure following FIG. 2.

FIGS. 4A and 4B are cross sections for describing the procedure following FIG. 3.

FIGS. 5A and 5B are cross sections for describing the procedure following FIG. 4.

FIGS. 6A and 6B are cross sections for describing the procedure following FIG. 5.

FIG. 9 is a plan view of a thin film magnetic head manufactured through the first embodiment of the invention.

FIGS. 19A and 19B are cross sections for describing the manufacturing procedure of a thin film magnetic head according to a ninth embodiment of the invention.

FIGS. 20A and 20B are cross sections for describing the procedure following FIG. 19.

FIGS. 21A and 21B are cross sections for describing the procedure following FIG. 20.

FIGS. 22A and 22B are cross sections for describing the procedure following FIG. 21.

FIGS. 23A and 23B are cross sections for describing the procedure following FIG. 22.

FIGS. 24A and 24B are cross sections for describing the procedure following FIG. 23.

FIG. 28 is a cross section for describing the constitution of a thin film magnetic head according to a eleventh embodiment of the invention.

FIGS. 31A and 31B are cross sections for describing a manufacturing procedure of a thin film magnetic head according to the invention.

FIGS. 32A and 32B are cross sections for describing the procedure following FIG. 31.

FIGS. 33A and 33B are cross sections for describing the procedure following FIG. 32.

DETAILED DESCRIPTION OF THE PREFERRED EMBODIMENTS

Figures 7A, 7B:
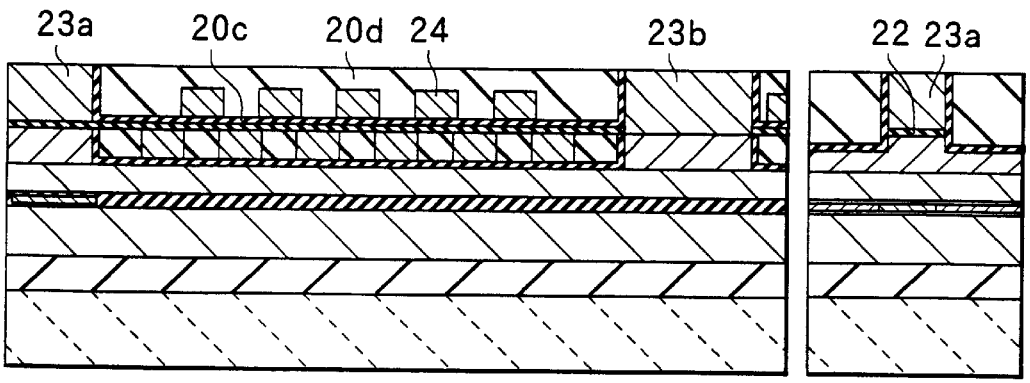
FIGS. 7A and 7B are cross sections for describing the procedure following FIG. 6.

Embodiments of the invention will be described with reference to the drawings in the followings.

FIRST EMBODIMENT

FIGS. 1A and 1B to FIGS. 8A and 8B illustrate a manufacturing procedure of a composite thin film magnetic head as a thin film magnetic head according to the first embodiment of the invention respectively. FIGS. 1A~8A show cross sections vertical to the track surface (ABS), and FIGS. 1B~8B show cross sections parallel to the track surface of the magnetic pole portion.

First, the constitution of a composite thin film magnetic head according to the embodiment of the invention will be described with reference to FIGS. 8A and 8B. The magnetic head comprises a magnetoresistive reading head (called reproduction head portion in the followings) 1A for reproduction and a inductive recording head (called recording head portion in the followings) 1B for recording.

The reproduction head portion 1A is a pattern of magnetoresistive film (called GMR film in the followings) 15 being formed on a substrate 11 made of, for example, aluminum oxide and titanium carbide ($Al_2O_3$ TiC) through an insulating layer 12 formed with, for example, alumina (aluminum oxide, $Al_2O_3$), a bottom shield layer 13 formed with, for example, permalloy (NiFe), and a shield gap layer 14 formed with, for example, alumina in order. Further, a lead terminal layer 15a made of material such as tantalum (Ta) or tungsten (W) which does not diffuse onto the GMR films is formed on the shield gap layer 14, and the lead terminal layer 15a is electrically connected to a GMR film 15. The GMR film 15 is formed with a free layer made of, for example, permalloy (NiFe alloy) or with several types of materials having magnetoresistive, such as antiferromagnetic film made of PtMn, IrMn, and RuRhMn. A shield gap layer 17 made of such as alumina is stacked on the GMR film 15 and the lead terminal layer 15a. In other words, the GMR film 15 and the lead terminal layer 15a are buried between the shield gap layers 14 and 17. Further, it is not specifically limited to the GMR film 15 but also other magnetoresistive film such as the AMR film can be used in the invention.

The recording head portion 1B is a top pole formed on the reproduction head portion 1A through the upper shield layer-cum-bottom pole for the GMR film 15 and a write gap layer 22.

In the embodiment, the bottom pole is formed being divided into a bottom pole layer (bottom pole) 18 formed on the shield gap layer 17, and a bottom pole tip 19a formed on the bottom pole layer 18 on the track surface side. Likewise, the top pole is divided into two: one is the top pole tip 23a formed on a write gap layer 22 on the bottom pole tip 19a on the track surface side, and the other is a yoke-cum-top pole layer (top pole ) 25 which has a contact with the top pole tip 23a, and is formed along the upper surface of the apex including the coil which is to be described later. The top pole layer 25 is magnetically coupled to the bottom pole layer 18 through the top connecting portion 23b and the bottom connecting portion 19b in the position which is the opposite (right-hand side in FIG. 8A) of the track surface.

The bottom pole layer 18, the bottom pole tip 19a, the bottom connecting portion 19b, the top pole tip 23a, the top connecting portion 23b and the top pole layer 25 are formed with, for example, high saturation flux density material (Hi-Bs material), for example, NiFe (Ni: 50 weight percentage, Fe: 50 weight percentage), NiFe (Ni: 80 weight percentage, Fe: 20 weight percentage), FeN, FeZrNP, CoFeN and so on respectively.

In the recording head portion 1B, the bottom pole tip 19b facing the top pole tip 23a has a trim structure in which part of the surface area is processed to a convex shape. As a result, when writing data, widening of the effective write track width, that is, widening of the magnetic flux in the bottom pole can be suppressed.

In the embodiment, the bottom pole layer 18 corresponds to the first magnetic layer of the invention, and the bottom pole tip 19a to the first magnetic pole of the invention respectively. Further, the top pole tip 23a corresponds to the second magnetic pole of the invention, and the top pole layer 25 to the second magnetic layer of the invention respectively.

In the embodiment, a first layer of the thin film coil 21 is formed in a concave region between bottom pole tip 19a and the bottom connecting portion 19b on the bottom pole layer 18. That is, an insulating layer 20a is formed in inner wall surface (bottom and side-wall surface) of the concave region, and a thin film coil 21 is formed on the insulating layer 20a. Between the bundles of coils of the thin film coil 21 is buried with an insulating layer 20b, and the surface of the insulating layer 20b and the bottom pole tip 19a are flattened so that both surface make the same surface. For this, a step of the apex area including a thin film coil 24 which is to be described later is lowered about the size of the thin film coil 21. The insulating layer 20a corresponds to the first insulating layer of the invention, and the insulating layer 20b to the second insulating layer of the invention respectively.

A write gap layer 22 is extended on the flattened insulating layer 20b and the thin film coil 21. An insulating layer 20c is formed in the concave region between the top pole tip 23a and the top connecting portion 23b on the write gap layer 22. A second layer of the thin film coil 24 is formed on the insulating layer 20c. The thin film coil 24 is covered with an insulating layer 20d made of, for example, alumina. The insulating layer 20c corresponds to a third insulating layer of the invention and the insulating layer 20d corresponds to other insulating layer of the invention respectively.

A yoke-cum-top pole layer 25 is formed on the insulating layer 20d. The top pole layer 25 is covered with an over coat layer 26. The thin film coils 21 and 24 are electrically connected to each other on the border surface between the insulating layer 20b and the insulating layer 20d, though not shown in the figure.

With the magnetic head, information is read out from a magnetic disk, not shown in the figure, by using megnetoresistive effect of the GMR film 15 in the reproduction head portion 1A, while information is written to a magnetic disk by using a change of magnetic flux between the top pole tip 23a and the bottom pole tip 19a by the thin film coils 21 and 24 in the recording head portion 1B.

Next, a manufacturing method of the composite thin film magnetic head is to be described.

In the manufacturing method according to the embodiment of the invention, first, as shown in FIG. 1, an insulating layer 12 of about 3~5 μm in thickness, made of, for example, alumina ($Al_2O_3$) is formed on a substrate 11 made of, for example, aluminum oxide and titanium carbide ($Al_2O_3 \cdot TiC$) by, for example, sputtering method. Next, a bottom shield layer 13 for a reproduction head is formed by selectively forming permalloy (NiFe) of about 3 μm in thickness on the insulating layer 12 by plating method using a photoresist film as a mask. Then, an alumina film (not shown in the figure) of about 4~6 μm is formed by, for example, sputtering or CVD (Chemical Vapor Deposition) method and is flattened by CMP.

Next, as shown in FIG. 2, a shield gap layer 14 is formed by depositing, for example, alumina of about 100~200 nm in thickness on the bottom shield layer 13 by sputtering method. Then, an MR film 15 for forming such as an MR element for reproduction is formed in tens of nanometers in thickness on the shield gap layer 14, and a desired shape is obtained by photolithography with high precision. Next, a lead terminal layer 15a facing the GMR film 15 is formed by lift-off method. Next, a shield gap layer 17 is formed on the shield gap layer 14 and the lead terminal layer 15a, and the GMR film 15 and the lead terminal layer 15a are buried in the shield gap layers 14 and 17.

Next, a top shield-cum-bottom pole layer (bottom pole) 18 of about 1.0~1.5 $\mu$m in thickness, made of, for example, permalloy (NiFe) is formed on the shield gap film 17.

Next, as shown in FIG. 3, the bottom pole tip 19a and the bottom connecting portion 19b of about 2.0~2.5 $\mu$m in thickness are formed on the bottom pole layer 18. Here, the bottom pole tip 19a is formed with the track side tip portion being in the vicinity of the GMR (MR) height 0 position, and with the opposite side of the track surface being in the throat height 0 position. The bottom pole tip 19a and the bottom connecting portion 19b may be formed with plating films such as NiFe as described, and may also be formed with sputter films such as FeN, FeZrNP and CoFeN.

Further, the insulating layer 20a of about 0.3~0.6 $\mu$m in thickness, made of insulating materials such as alumina is formed all over the surface by, for example, sputtering method or CVD method.

Next, as shown in FIG. 4, a first layer of the thin film coil 21 for a inductive-type recording head, made of, for example, copper (Cu) is formed in thickness of about 1.5~2.5 $\mu$m in the concave region formed between the bottom pole tip 19a and the bottom connecting portion 19b by, for example, electroplating method.

Next, as shown in FIG. 5, after forming the insulating layer 20b of about 3.0~4.0 $\mu$m in thickness, made of an insulating material such as alumina all over the surface by sputtering method, the surface is flattened by, for example, CMP method so as to make the surface of the bottom pole tip 19a be exposed. Here, in the embodiment, the surface of the thin film coil 21 is exposed at the same time, however, part of the surface, except for the connecting portion of the thin film coil 21 and a second layer of the thin film coil 24 which is to be described later is not required to be exposed.

Next, as shown in FIG. 6, a write gap layer 22 of about 0.2~0.3 $\mu$m in thickness, made of an insulating material such as alumina is formed by sputtering method. The write gap layer 22 may be formed with aluminum nitride (AlN), silicon oxide, silicon nitride and so on, besides with alumina. Then, an opening 22a for connecting the top pole and the bottom pole is formed by patterning the write gap layer 22 by photolithography.

Further, the top pole tip 23a for determining the track width of the recording head is formed on the write gap layer 22 by photolithography. That is, a magnetic layer of about 2.5~3.5 $\mu$m in thickness, made of high saturation flux density material (Hi-Bs material), for example, NiFe (Ni: 50 weight percentage, Fe: 50 weight percentage), NiFe (Ni: 80 weight percentage, Fe: 20 weight percentage), FeN, FeZrNP, CoFeN and so on is formed on the write gap layer 22 by, for example, sputtering method. Further, the top pole tip 23a is formed by selectively removing the magnetic layer by, for example, ion-milling with Ar (argon) using a photoresist mask, while the top connecting portion 23b for magnetically connecting the top pole and the bottom pole is formed. The top pole tip 23a and the top connecting portion 23b may be etched using a mask made of inorganic insulating layer such as alumina, instead of using the photoresist mask. Further, it may be formed by, other than the photolithography, plating method or sputtering method.

Further, having the top pole tip 23a as a mask, the write gap layer 22 and the bottom pole tip 19a in the vicinity are etched in a self-aligned manner. That is, a recording track with a trim structure is formed by further etching the bottom pole tip 19a about 0.3~0.6 $\mu$m by ion-milling with Ar after selectively removing the write gap layer 22 by RIE (Reactive Ion Etching) with chlorine gas ($Cl_2$, $CF_4$, $BCl_2$, $SF_6$ and so on), having the top pole tip 23a as a mask.

Further, the insulating layer 20c of about 0.3~0.6 $\mu$m in thickness, made of, for example, alumina is formed all over the surface by, for example, sputtering method or CVD method. Further, a second layer of the thin film coil 24 for an inductive-type recording head, made of, for example, copper (Cu) is formed on the insulating layer 20c in thickness of about 1.5~2.5 $\mu$m by, for example, electroplating.

Next, as shown in FIG. 7, the insulating layer 20d of about 3~4 $\mu$m in thickness, made of such as alumina is formed all over the surface by, for example, sputtering method or CVD method. The insulating layer 20d and the insulating layer 20c may be formed with other insulating materials such as silicon dioxide ($SiO_2$) or silicon nitride (SiN) besides with alumina. Then, the insulating layer 20d and the insulating layer 20c are etched so as to make the surfaces of the top pole tip 23a and the top connecting portion 23b be exposed, and are flattened so that the surfaces of the insulating layers 20c and 20d, and each surface of the top pole tip 23a and the top connecting portion 23b forms the same surface.

Figures 8A, 8B:
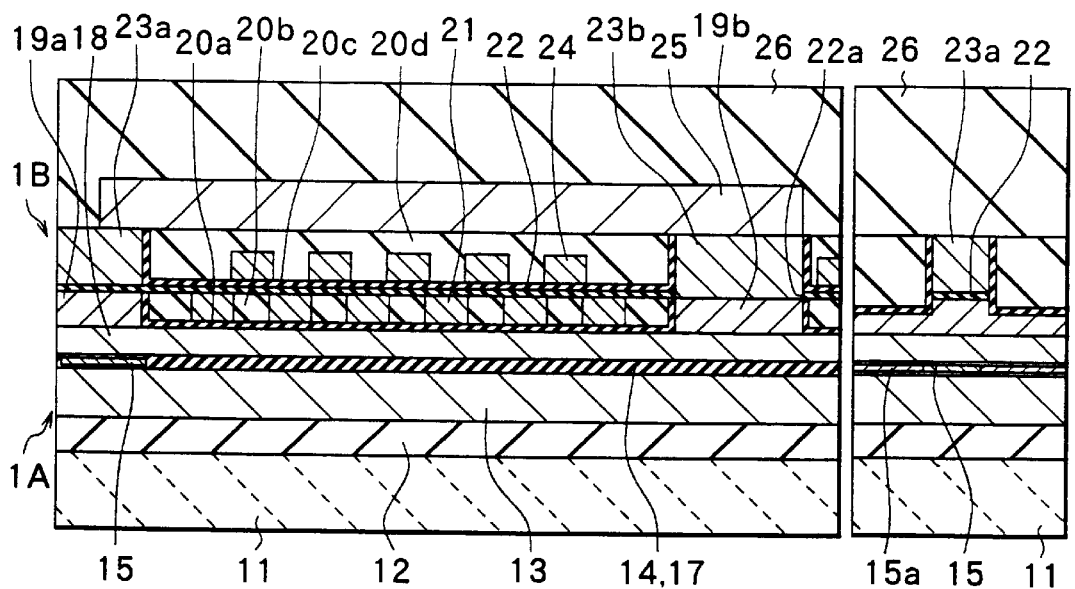
FIGS. 8A and 8B are cross sections for describing the procedure following FIG. 7.

Next, as shown in FIG. 8, the top pole layer 25 of about 3~4 $\mu$m in thickness is formed using the same material as, for example, the top pole tip 23a by, for example, electroplating method or sputtering method. The top pole layer 25 has a contact with the bottom connecting portion 19b through the top connecting portion 23a in a position rear of the thin film coils 21 and 24 from the track surface side (right-hand side in FIG. 8A), and is magnetically coupled to the bottom pole layer 18. At last, an over coat layer 26 of about 30 $\mu$m in thickness, made of alumina is formed on the top pole layer 25 by, for example, sputtering method. A thin film magnetic head is completed by performing a slider machine processing and by forming a track surface (ABS) of a recording head and a reproducing head.

FIG. 9 is a plan view of a thin film magnetic head according to the embodiment of the invention. The figure shows a state before the slider machine processing is performed. In these figures, TH represents the throat height, and the throat height is determined by the top pole side of the edge frame of the insulating layer 20a, that is, by the opposite side edge frame of the track surface of the bottom pole tip 19a. Further, 21a represents a lead wire of the thin film coil 21.

With the embodiment described above, effects described in the followings can be obtained.

(1) In the embodiment, the bottom pole is divided into the bottom pole tip 19a and the bottom pole layer 18, and the bottom pole tip 19a is formed on a flat surface of the bottom pole layer 18. As a result, the insulating layers 20a and 20b made of inorganic materials can be buried in the concave region between the bottom pole tip 19a and the bottom connecting portion 19b. Accordingly, the throat height is determined by the edge frame of the bottom pole tip 19a side of the insulating layer 20a (that is, edge frame of the opposite side of the track surface of the bottom pole tip 19a). As a result, precise control of the throat height can be achieved since a pattern shift of the edge frame by heat annealing or profile deterioration does not occur, unlike the photoresist film of a related art. Further, precise control of the GMR height and apex angle can be achieved.

Figure 11:
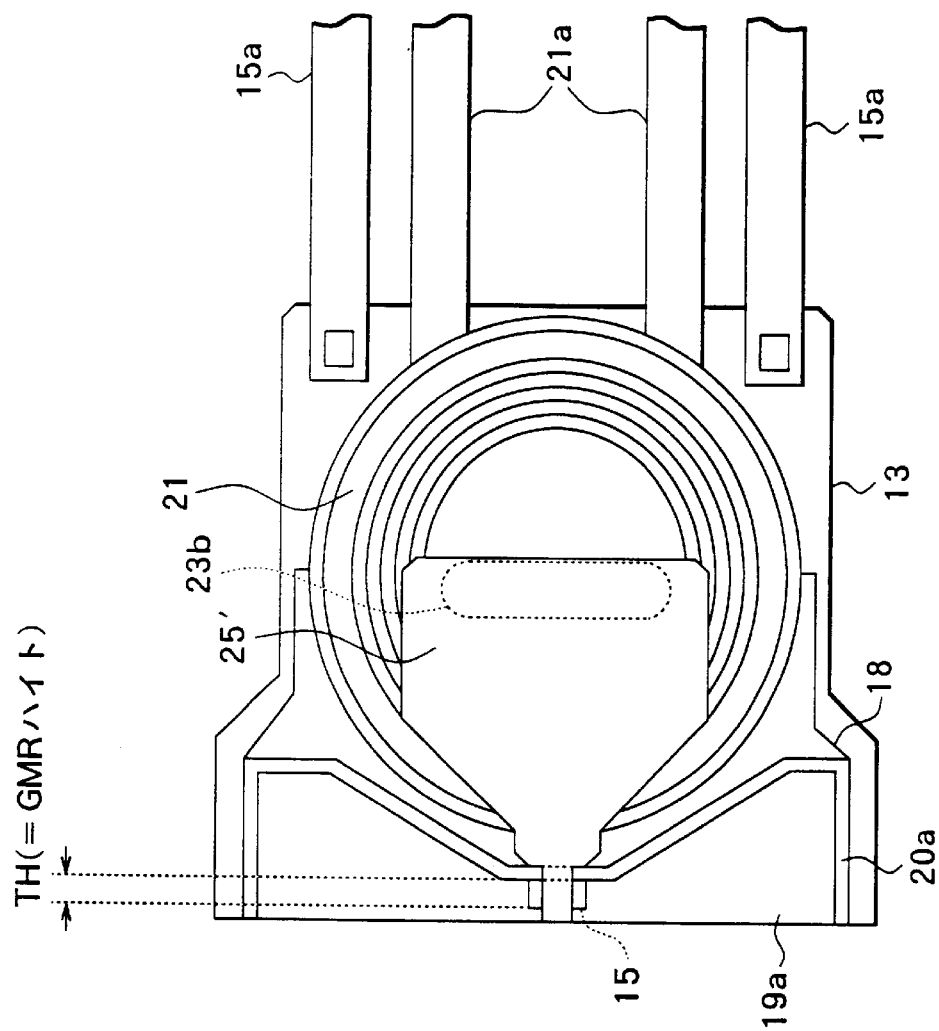
FIG. 11 is a plan view of a thin film magnetic head manufactured through a second embodiment of the invention.

(2) Further, in the embodiment, as shown in FIG. 11, when each pattern is seen from right above, the width of the bottom pole tip 19a is made wider than the width of the top pole tip 23a. As a result, even if the top pole tip 23a is a narrow track with half-micron width, the magnetic flux does not saturate in the vicinity of the bottom pole tip 19a.

(3) Further, in the embodiment, the insulating films 20a and 20b made of inorganic materials are provided between the thin film coil 21 and the top shield-cum-bottom pole layer 18, and the write gap film 22 and the insulating layer 20c are provided between the thin film coils 21 and 24. As a result, by adjusting the thickness of each insulating layer, a large insulating pressure resistant between each of the thin film coils 21 and 24, and the top shield can be obtained so that insulating character can be maintained and leaking of the magnetic flux from the thin film coils 21 and 24 can be decreased.

(4) Further, in the embodiment, the top pole is divided into the top pole tip 23a and the top pole layer 25, and the top pole tip 23a is formed on a flat surface of the bottom pole tip 19a. As a result, the top pole tip 23a for determining the recording track width can be formed to a submicron measurement with high precision. In addition, in the embodiment, a first layer of the thin film coil 21 is buried in the concave region adjacent to the bottom pole tip 19a by the insulating layer 20b, while the surface of the insulating layer 20b is flattened so that its surface forms the same surface with the surface of the bottom pole tip 19a. That is, the step of the apex area including a second layer of the thin film coil 24 becomes lower about the size of the first layer of the thin film coil 21 comparing to the structure of a related art. Accordingly, when forming the top pole layer 25 which has a contact partially with the top pole tip 23a by photolithography, differences in thickness of the photoresist film in the top and the bottom of the apex area is decreased. As a result, micronization of the submicron measurement of the top pole layer 25 can be achieved. Accordingly, with the thin film magnetic head obtained through the embodiment, high surface density recording by a recording head can be achieved, and performance of the recording head can be improved by stacking the coils to two layers and three layers. When applying photolithography to the top pole tip 23a and the top pole layer 25, by using an inorganic insulating layer as a mask instead of the photoresist, micronization of the top pole tip 23a and the top pole layer 25 with higher precision can be achieved. Further, even in a case where the top pole tip 23a and the top pole layer 25 are formed by such as sputtering, other than photolithography, micronization of the top pole tip 23a and the top pole layer 25 can be achieved since influence of the steps of the apex area is decreased as well.

Further, in the embodiment, since there is no slope area of the photoresist pattern, unlike that of a related art, the first and the second layer of the thin film coils 21 and 24 can be formed on a flat area so that the distance between the coil outer peripheral edge by the slope and the throat height 0 position does not prevent the yoke length from shortening. Accordingly, in the embodiment, the yoke length can be made shorter, and high frequency characteristic of the recording head can be improved prominently. In the embodiment, it can be designed with a locating error by photolithography of equal to, or less than 0.1 $\mu$m~0.2 $\mu$m, so that the yoke length can be decreased to equal to or less than 50% of that of a related art.

(6) Further, in the embodiment, the magnetic layers such as the top pole tip 23a and the top pole layer 25 are formed with high saturation flux density (Hi-Bs) materials, so that, even if the track width becomes narrower, the magnetic flux generated in the thin film coils 21 and 24 does not saturate on the way, but effectively reach the top pole tip 23a and the bottom pole tip 19a. As a result, a recording head without a magnetic loss can be achieved.

(7) Further, in the embodiment, the top pole layer 25 formed on the top pole tip 23a for determining the track width is not exposed to the track surface, so that side write by the top pole layer 25 does not occur.

Other embodiment of the invention will be described in the followings. In the description, like numerals are adopted to the structures identical to the first embodiment and the description is omitted. The distinguished structures will be described in the followings.

SECOND EMBODIMENT

Figures 10A, 10B:
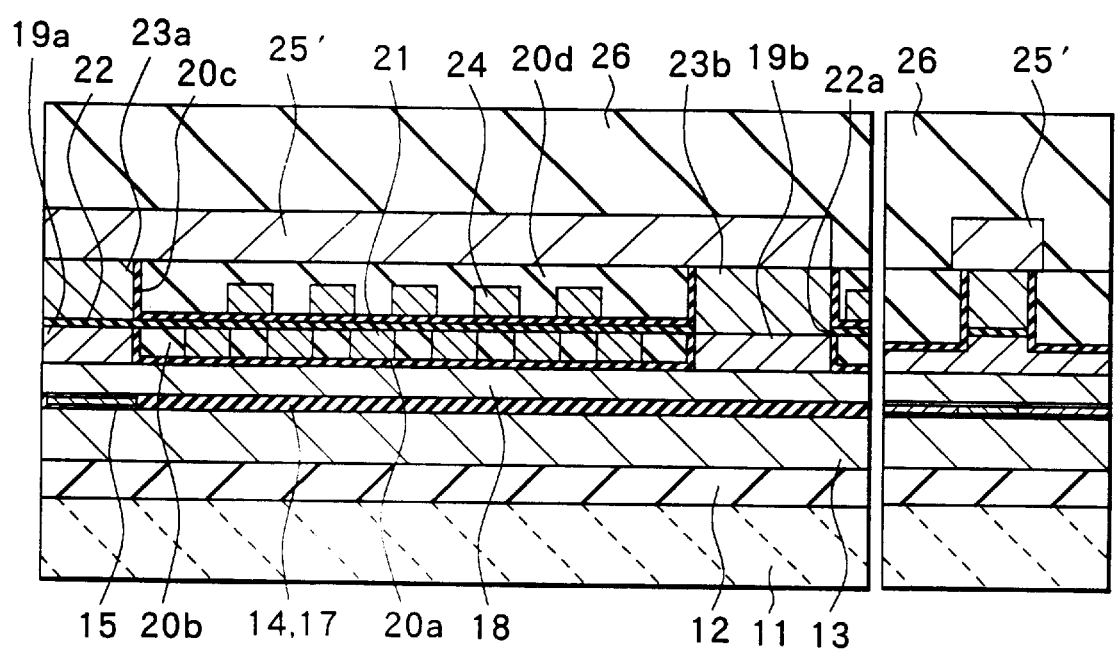
FIGS. 10A and 10B are cross sections for describing the constitution of a thin film magnetic head according to the first embodiment of the invention.

FIGS. 10A and 10B show the constitution of a composite thin film magnetic head according to a second embodiment of the invention. In the first embodiment, the top pole layer 25 is formed in a position recessed from the track surface, however, in this embodiment, the top pole layer 25' along with the top pole tip 19a are exposed to the track surface. Here, by having the thickness of the top pole tip 23a, for example, 2~3 $\mu$m, side write can be avoided without having a structure in which the top pole layer is recessed from the track surface (recessed structure). Other operation effects are identical to the first embodiment. FIG. 11 shows a plan view of a thin film magnetic head according to the embodiment.

Figures 12A, 12B:
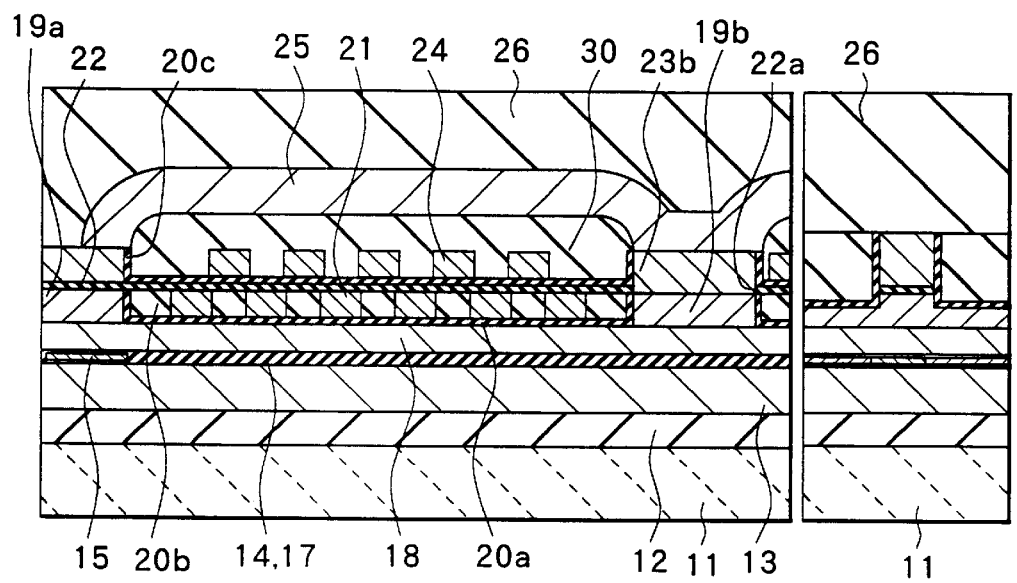
FIGS. 12A and 12B are cross sections for describing the constitution of a thin film magnetic head according to a third embodiment of the invention.

In the embodiment, as shown in FIGS. 12A and 12B, the procedure until forming the second layer of the thin film coil 24 is identical to the first embodiment. After that, the thin film coil 24 is covered with a photoresist film 30, then, the top pole layer 25 is formed on the photoresist film 30 without the pole tip being exposed to the track surface. In the embodiment, unlike the first embodiment, flattening the surface by CMP after forming the second layer of the thin film coil 24 is not performed. Accordingly, manufacturing cost is decreased comparing to the first embodiment. The second layer of the thin film coil 24 with five turns is formed in a flat area of the first layer of the thin film coil 21 with six turns, so that the distance from the outer peripheral end of the thin film coil 24 to the throat height 0 position does not affect the yoke length. Other operation effects are identical to those of the first embodiment.

FOURTH EMBODIMENT

Figures 13A, 13B:
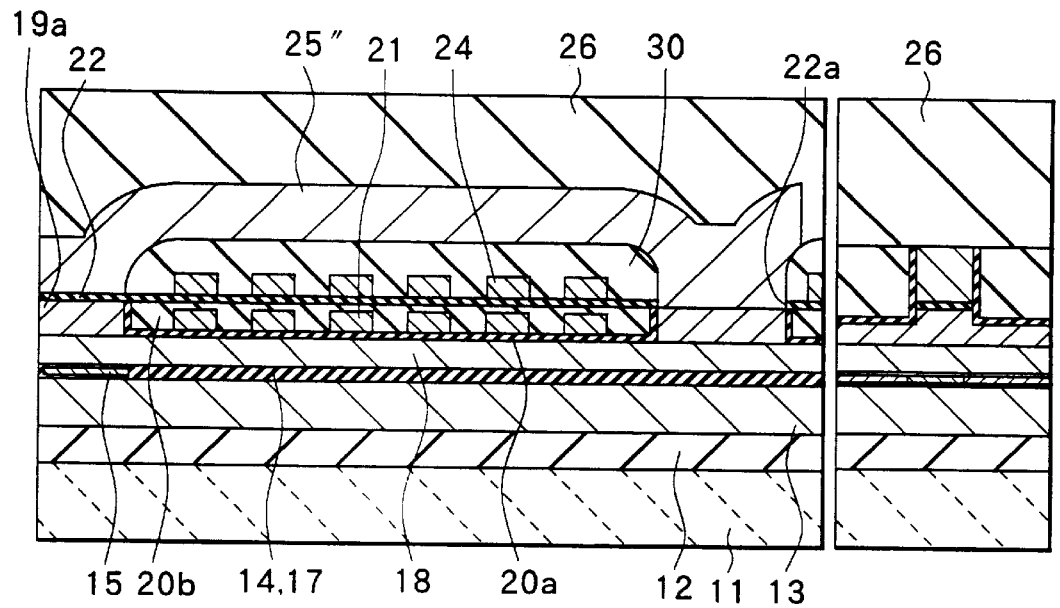
FIGS. 13A and 13B are cross sections for describing the constitution of a thin film magnetic head according to a fourth embodiment of the invention.

FIGS. 13A and 13B show a fourth embodiment of the invention. In the embodiment, the structure of the top pole is not divided into two. In other words, a second layer of the thin film coil 24 is formed on the write gap layer 22 without forming the top pole tip, then, the thin film coil 24 is covered with the photoresist film 30. Then, the top pole layer 25' is formed on the photoresist film 30 with the pole tip (pole portion) being exposed to the track surface. In the embodiment, unlike the first embodiment, flattening the surface by CMP after forming the second layer of the thin film coil 24 is not performed, so that the manufacturing cost is decreased comparing to the first embodiment. Other operation effects are identical to those of the first embodiment.

FIFTH EMBODIMENT

Figures 14A, 14B:
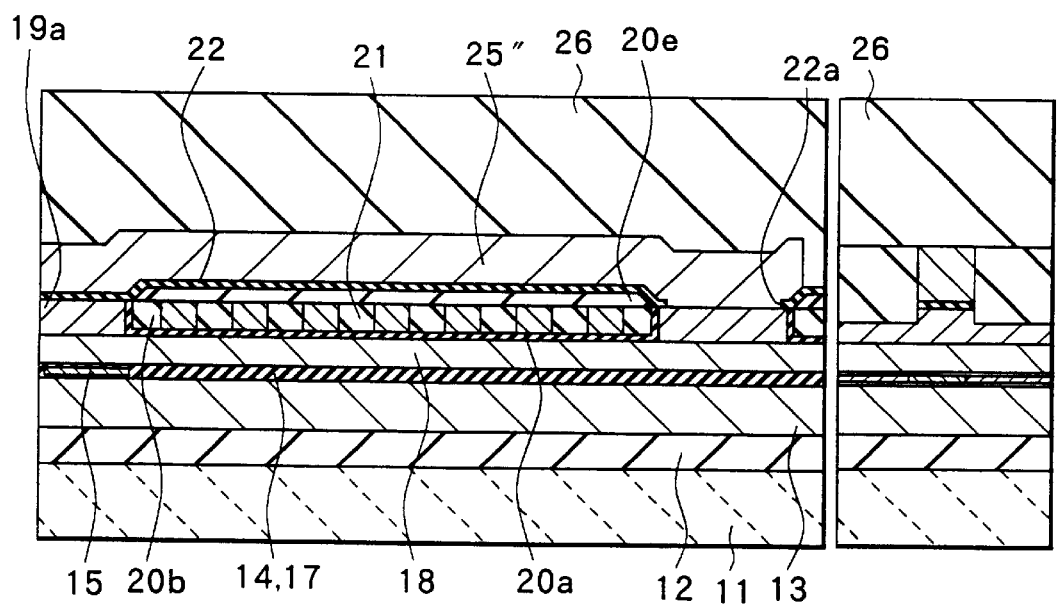
FIGS. 14A and 14B are cross sections for describing the constitution of a thin film magnetic head according to a fifth embodiment of the invention.

FIGS. 14A and 14B show a composite thin film magnetic head according to a fifth embodiment of the invention. In the magnetic head, the coil portion is the thin film coil 21 with a single layered structure, and the thin film coil 21 is formed with narrower pitch than the embodiments described above. Further, an insulating layer 20e of, for example, 1.0 μm in thickness, made of photoresist is formed on the thin film coil 21 and the write gap layer 22 is formed, then, the top pole layer 25" is formed to be exposed to the track surface without forming the top pole tip. In the embodiment, the top pole layer 25" can be formed directly on the flattened surface so that micronization of the track width of the recording head can be achieved further than the embodiments described above.

Figures 15A, 15B:
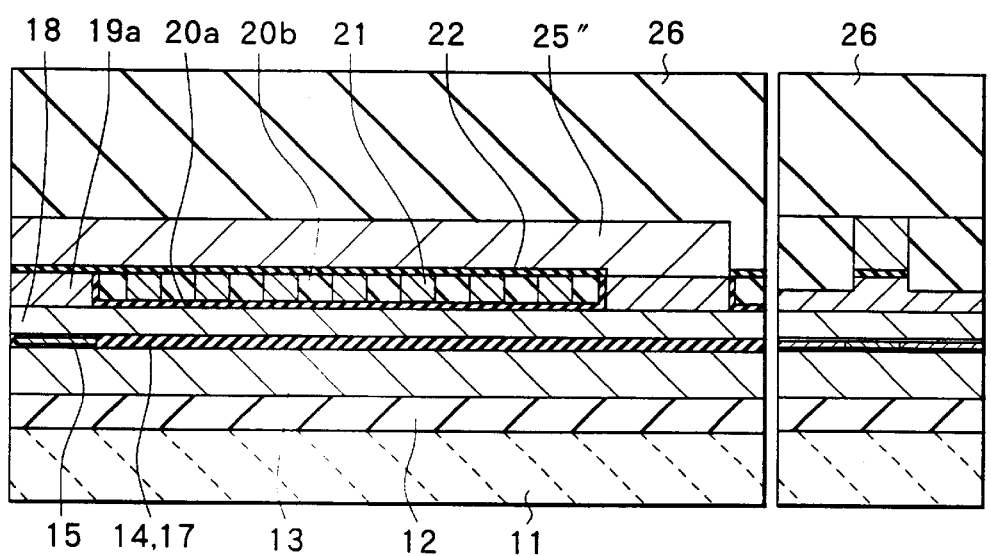
FIGS. 15A and 15B are cross sections for describing the constitution of a thin film magnetic head according to a fifth embodiment of the invention.

As shown in FIGS. 15A and 15B, without forming the insulating layer 20e (FIG. 14A), the same effect as described above can be obtained also in a case where the write gap layer 22 is formed on the bottom pole tip 19a and the thin film coil 21, and the top pole layer 25" is formed, then, the surface of the top pole layer 25" is flattened by, for example, CMP method.

SIXTH EMBODIMENT

Figures 16A, 16B:
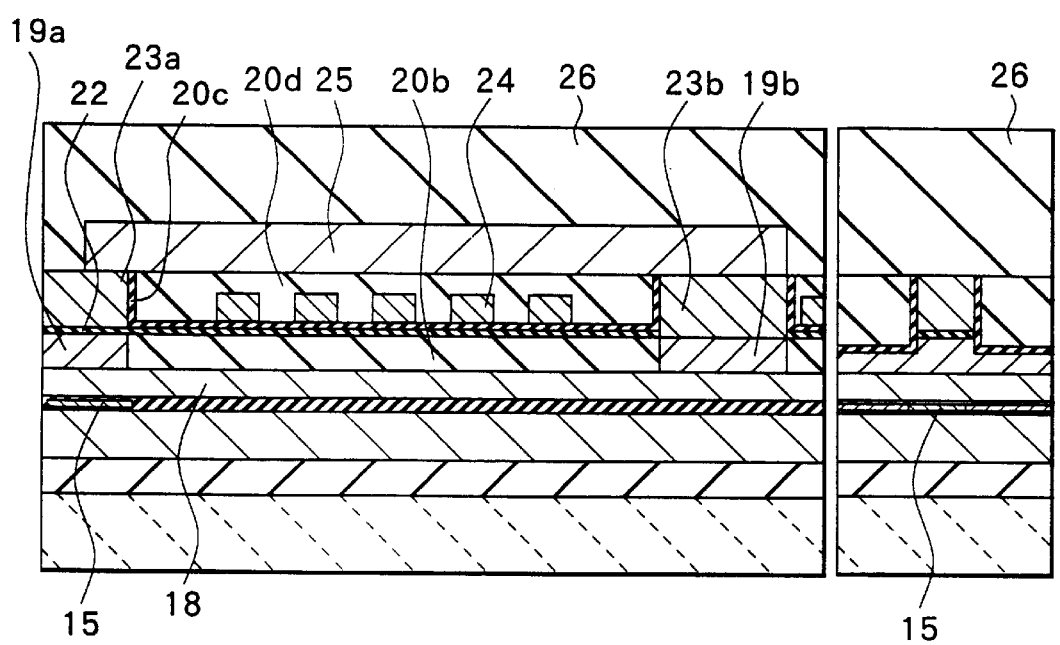
FIGS. 16A and 16B are cross sections for describing the constitution of a thin film magnetic head according to a sixth embodiment of the invention.

FIGS. 16A and 16B show a sixth embodiment of the invention. The embodiment has a structure in which the whole part of a first layer of coil forming portion is buried by the insulating layer 20b made of, for example, alumina in the first embodiment (FIG. 8). The description will be omitted since the effects of the embodiment are substantially identical to those of the first embodiment.

SEVENTH EMBODIMENT

Figures 17A, 17B:
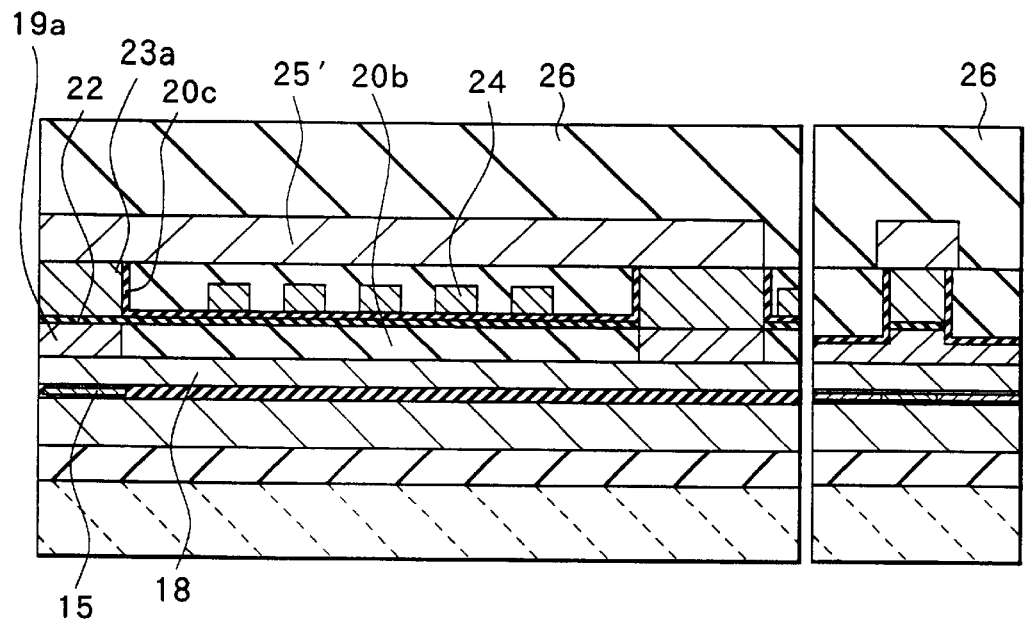
FIGS. 17A and 17B are cross sections for describing the constitution of a thin film magnetic head according to a seventh embodiment of the invention.

FIGS. 17A and 17B show a seventh embodiment of the invention. The embodiment has a structure in which the whole part of the first layer of coil forming portion is buried by the insulating layer 20b made of, for example, alumina in the second embodiment (FIG. 10). The description is to be omitted since the effects of the embodiment are substantially identical to those of the second embodiment.

EIGHTH EMBODIMENT

Figures 18A, 18B:
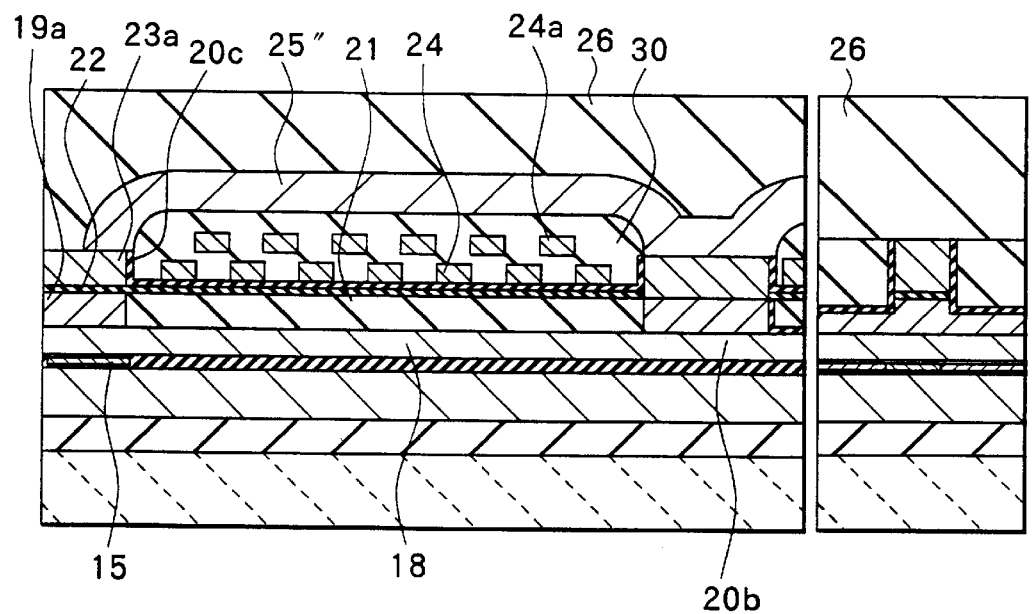
FIGS. 18A and 18B are cross sections for describing the constitution of a thin film magnetic head according to a eighth embodiment of the invention.

FIGS. 18A and 18B show an eighth embodiment of the invention. The embodiment has a structure in which the whole part of the first layer of coil forming portion is buried by the insulating layer 20b made of, for example, alumina in the third embodiment (FIG. 12), and the two layers of the thin film coils 24 and 24a are covered with the photoresist film 30. The description is to be omitted since the effects of the embodiment are substantially identical to those of the third embodiment.

FIGS. 19A and 19B to FIGS. 25A and 25B show the manufacturing procedure of a thin film magnetic head according to a ninth embodiment of the invention.

Figure 25A:
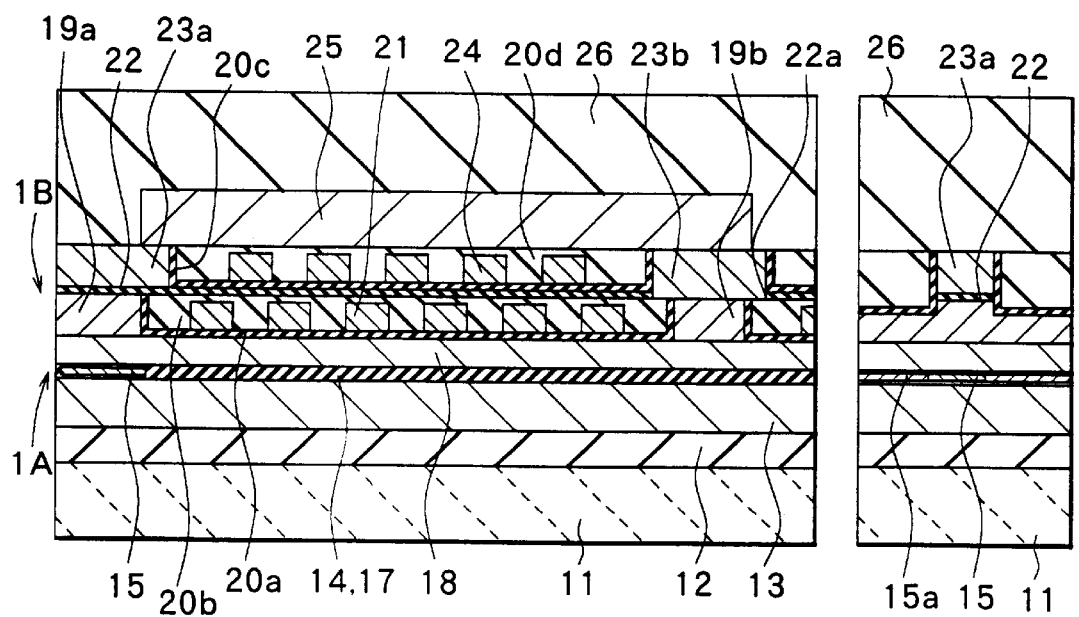
FIGS. 25A and 25B are cross sections for describing the procedure following FIG. 24.
Figure 25B:
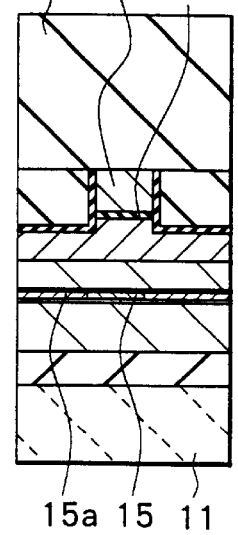

In the embodiment, as shown in FIGS. 25A and 25B, the top pole tip 23a is formed longer than the bottom pole tip 19a. Further, the width of the top connecting portion 23b is different from the width of the bottom connecting portion 19b, that is, the areas of the two are different. Specifically, the area of the top connecting portion 23b is larger than the area of the bottom connecting portion 19b. Further, the bottom connecting portion 19b has a contact with the center position of the top connecting portion 23b. As a result, flow of the magnetic flux from the top pole layer 25 to the bottom pole layer 18 becomes smooth.

The manufacturing method of the thin film magnetic head is substantially identical to the first embodiment except that the top pole tip 23a is formed longer than the bottom pole tip 19a from the track surface to inside, the top connecting portion 23b is formed wider than the bottom connecting portion 19b, and the bottom connecting portion 19b has a contact with the center position of the top connecting portion 23b. Accordingly, description in detail is to be omitted.

Figure 26:
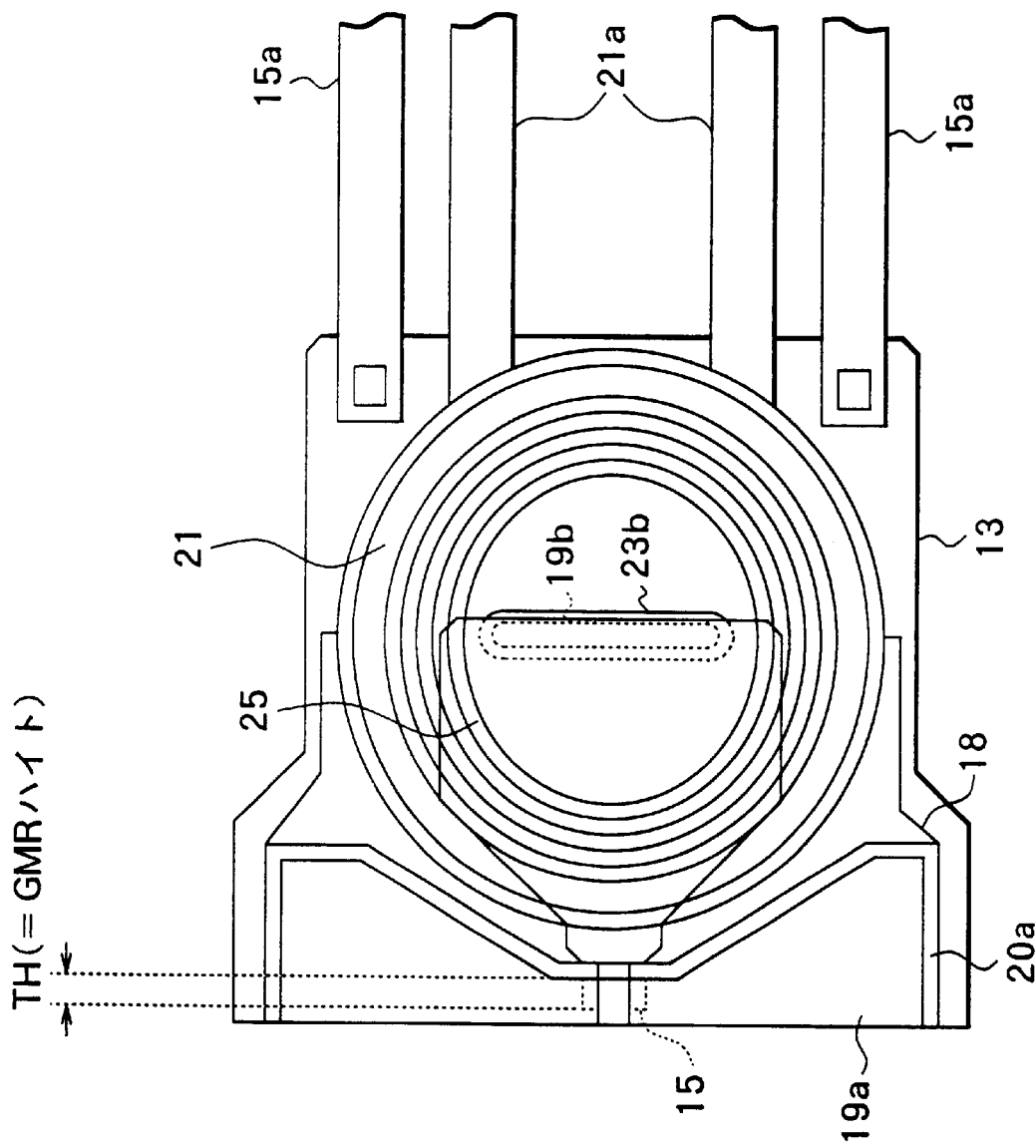
FIG. 26 is a plan view of a thin film magnetic head manufactured through the ninth embodiment of the invention.

FIG. 26 is a plan view of a thin film magnetic head according to the embodiment. This figure shows a state before the slider machine processing is performed. In the figure, TH represents the throat height, and the throat height TH is determined by the pole tip side edge frame of the insulating layer 20a, that is, the opposite side frame edge of the track surface of the bottom pole tip 19a. In the figure, TH is GMR height since the throat height TH is met with the GMR height. One of the edge of the lead terminal 21a is connected to the thin film coil 21. The other edge of the lead terminal 21a is connected to an electrode extract pad (not shown in the figure). Further, the other edge of the lead terminal layer 15a whose other edge is connected to the MR element 15 is also connected to the electrode extract pad (not shown in the figure).

In the embodiment, in addition to the effects of the first embodiment, the effects which will be described in the followings can be further obtained.

(1) In the embodiment, since the top pole tip 23a is formed to be longer than the bottom pole tip 19a, the contact area of the top pole tip 23a and the top pole layer 25 can be made larger than a case where the top pole tip 23a and the bottom pole tip 19a are formed to be the same length, and so that magnetic coupling can be better achieved in that area. Especially, this structure is effective when the top pole layer 25 is provided in a recessed position from the track surface (recessed structure), like the embodiment. In other words, if the top pole layer 25 is formed in a position which is closer to the track surface than the throat height=0 position (opposite edge frame of the track surface of the bottom pole tip 19a), for example, the vicinity of TH=0.5 μm, side write, which is writing information to adjacent track by the top pole layer 25, occurs. Idealistically, the top pole layer 25 is better to be formed in a position further from the track surface than TH 0 position. On the other hand, in the embodiment, the bottom pole tip 19a for determining TH is magnetically coupled to the top pole layer 25 through the top pole tip 23a. The top pole tip 23a and the top pole layer 25 are required to be firmly connected in the opposite direction of the track surface from the TH 0 position. Accordingly, it is preferable to form the top pole tip 23a longer than the bottom pole tip 19a.

(2) By the way, the top pole tip 23a and the bottom pole tip 19a are micronized and as the width becomes narrower, the contact area of the top pole and the bottom pole, that is, the width of the bottom connecting portion 19b and the top connecting portion 23b become narrower. When the width of the bottom connecting portion 19b and the top connecting portion 23b are micronized as described, and when the angle between the sidewall of the bottom connecting portion 19b and the bottom magnetic layer 18, or the angle between the sidewall of the top connecting portion 23b and the top magnetic layer 25 are vertical respectively, there is a problem that the magnetic flux may saturate in that area. However, in the embodiment, the area of the top connecting portion 23b is larger than that of the bottom connecting portion 19b and further, the bottom connecting portion 19b is facing the center area of the top connecting portion 23b so that, when looking at it in cross section, the whole contact area takes a shape having a slope along the slope surface between the top and bottom coils, that is, the whole contact area takes a shape as if it is a funnel. As a result, flow of the magnetic flux from the top pole to the bottom pole becomes smooth and magnetic coupling of both poles can be better achieved. Taper angle may be provided in each of the top connecting portion 23b and the bottom connecting portion 19b, and with the structure like this, flow of the magnetic flux from the top pole to the bottom pole becomes smoother. Further, inversely, the area of the bottom connecting portion 19b may be formed larger than the area of the top connecting portion 23b.

(3) Further, in the embodiment, as shown in FIGS. 25A and 25B, the top pole tip 23a which determines the track width is thinner than the top pole layer 25. As a result, even if much magnetic flux flows from the top pole layer 25, the magnetic flux does not saturate in that area since the distance between the top pole layer 25 and the write gap layer 22 is short. Accordingly, an over write characteristic and a non-linear transition (NLTS) is improved.

TENTH EMBODIMENT

Figures 27A, 27B:
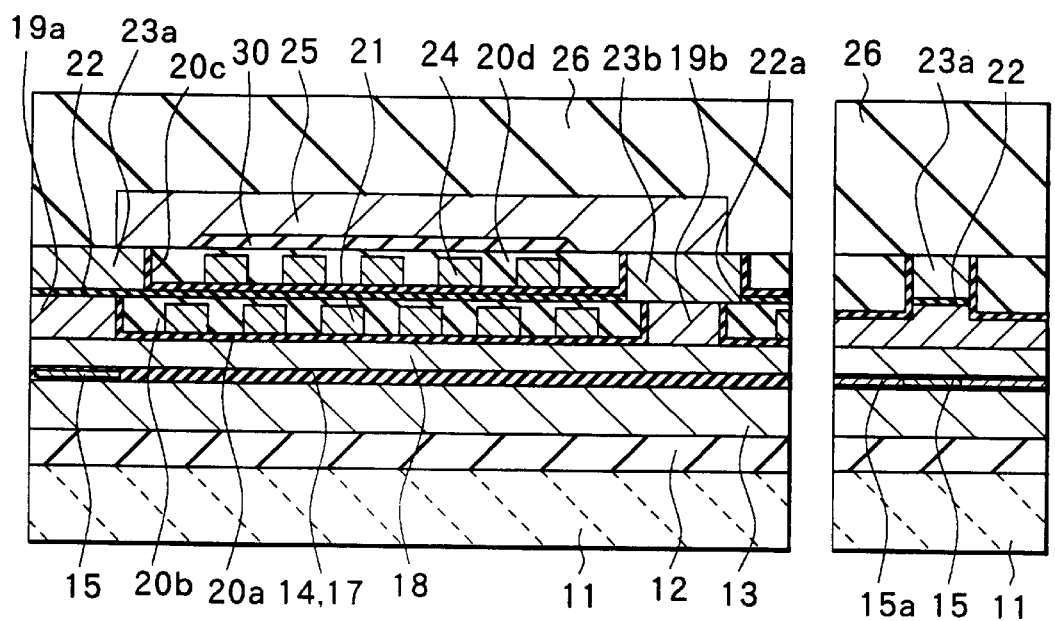
FIG. 27 is a cross section for describing the constitution of a thin film magnetic head according to a tenth embodiment of the invention.

FIGS. 27A and 27B show the constitution of a composite thin film magnetic head according to a tenth embodiment of the invention. In the ninth embodiment, a second layer of the thin film coil 24 is totally buried under the surface of the top pole tip 23a, that is, completely inside the flattened insulating layer 20d, however, when the top pole tip 23a is thin, the surface of the thin film coil 24 may be exposed during the flattening procedure of such as CMP. In the embodiment, to maintain insulating characteristic between the thin film coil 24 and the top pole layer 25 in such a case, an insulating layer 30 of about, for example, 1.0 $\mu$m in thickness, made of photoresist is selectively formed between the thin film coil 24 and the top pole layer 25. Other structures and operation effects are identical to those of the first embodiment so that the description is to be omitted.

ELEVENTH EMBODIMENT

In the embodiment, as shown in FIGS. 28A~28C, the procedure until forming the second layer of the thin film coil 24 is identical to the ninth embodiment. After that, the thin film coil 24 is covered with a photoresist film 31, then, the top pole layer 25 is formed on the photoresist film 31 without having the top tip exposed to the track surface. FIG. 28C is a plan view of the bottom pole tip 19a, the bottom connecting portion 19b, the top pole tip 23a, the top connecting portion 23b and the top pole layer 25 taken out from FIGS. 28A and 28B.

In the embodiment, unlike the ninth embodiment, flattening by CMP is not required to be performed after the second layer of the thin film coil 24 is formed. Accordingly, the manufacturing cost is decreased comparing to the ninth embodiment. The second layer of the thin film coil 24 with five turns is formed in a flat area of the first layer of the thin film coil 21 with six turns, so that the distance from the outer peripheral end of the thin film coil 24 to the throat height 0 position does not affect the yoke length. Other structures and operation effects are identical to those of the ninth embodiment so that the description is to be omitted.

Figure 29:
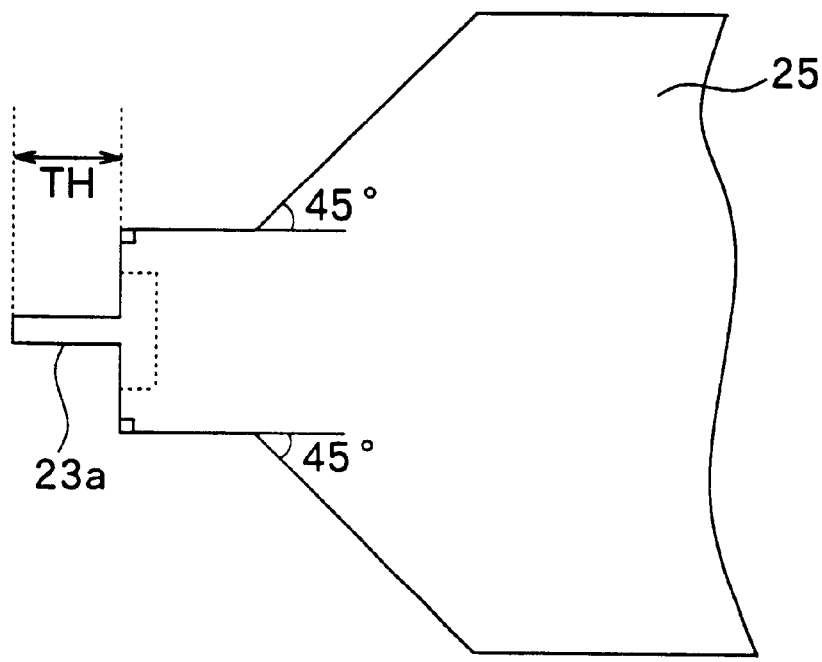
FIG. 29 is a cross section for describing a modification example of a thin film magnetic head according to the first embodiment of the invention.

The plan shape of the top pole tip 23a and the top pole layer 25 are not limited to the those shown in FIG. 28C, but may take a shape shown in, for example, FIG. 29.

The invention also includes other various modifications, not limiting to the embodiments. For example, in the embodiments, examples of forming the top pole tip 23a and the top pole layer 25 and so on with NiFe (Ni: 50 weight percentage, Fe: 50 weight percentage), NiFe (Ni: 80 weight percentage, Fe: 20 weight percentage), and high saturation flux density materials such as FeN, FeCoZr and so on are described, however, a structure of stacking more than two kinds of the materials may be possible.

Further, in the embodiments described above, the thin film coil to be buried in the concave formed adjacent to the bottom pole tip 19a is a single layer, however, it may be a stacking structure in which two or more layers of coils are buried.

Figure 30:
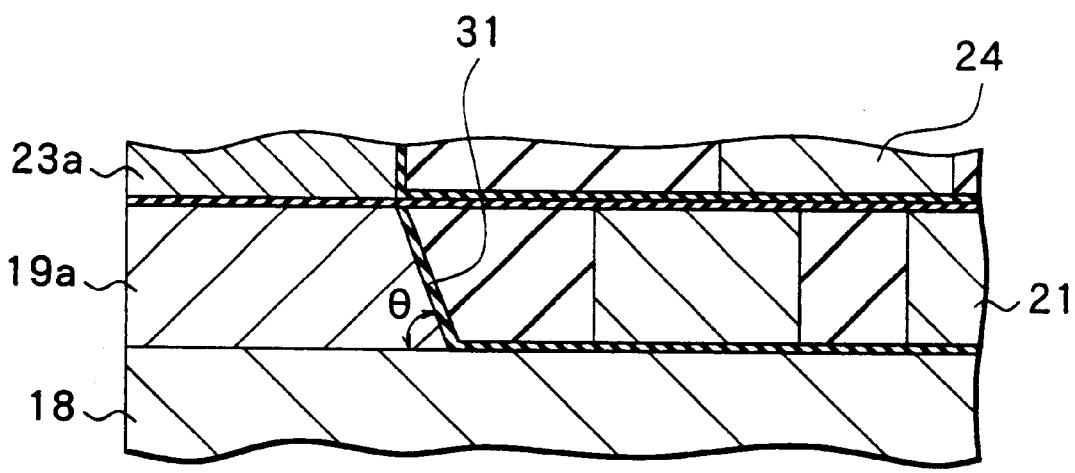
FIG. 30 is also a cross section for describing a modification example of a thin film magnetic head according to the first embodiment of the invention.
Figures 34A, 34B:
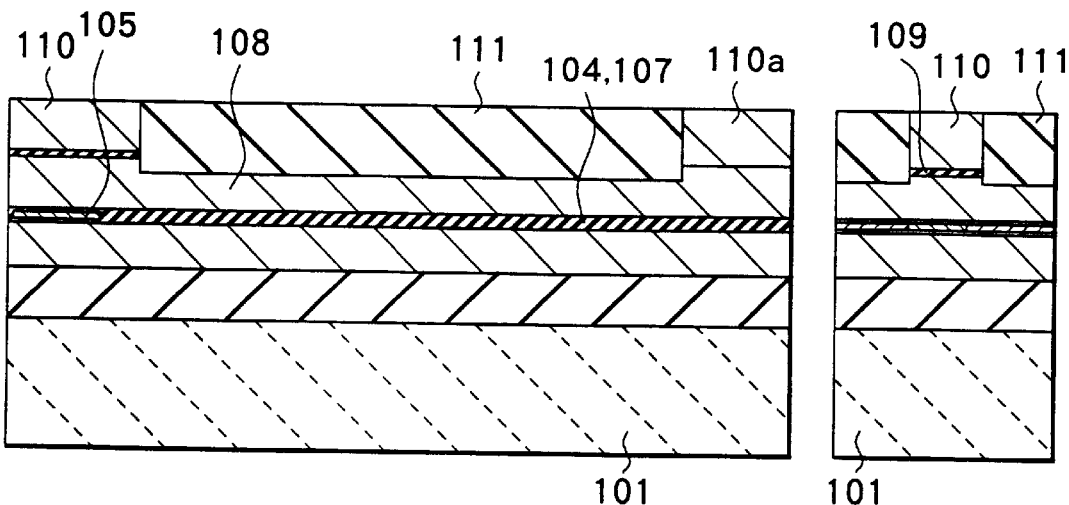
FIGS. 34A and 34B are cross sections for describing the procedure following FIG. 33.
Figures 35A, 35B:
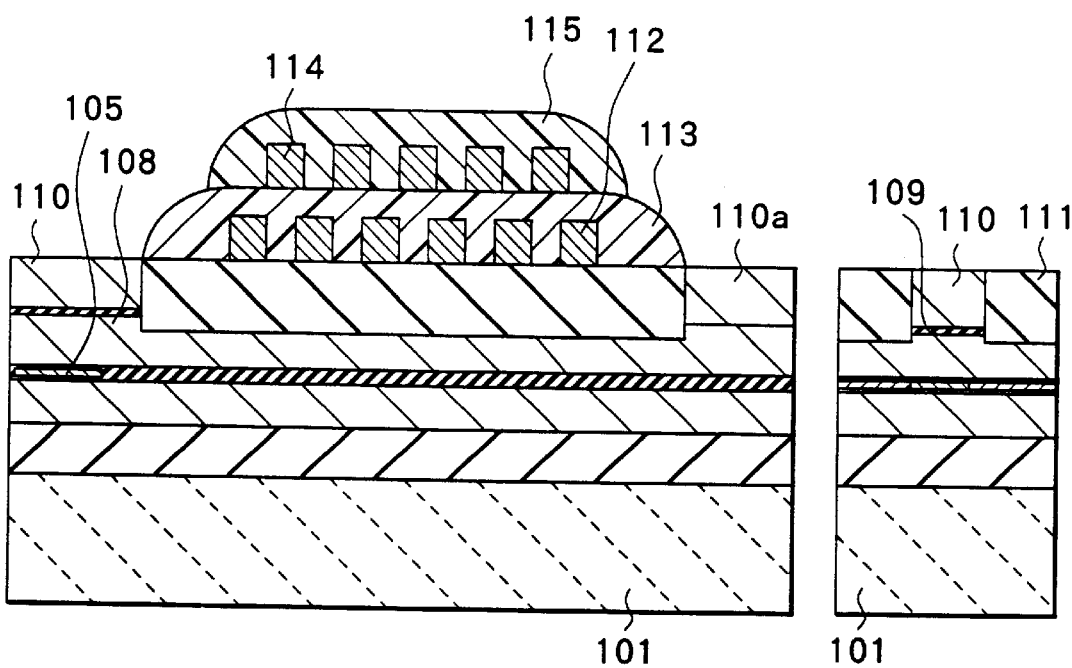
FIGS. 35A and 35B are cross sections for describing the procedure following FIG. 34.
Figures 36A, 36B:
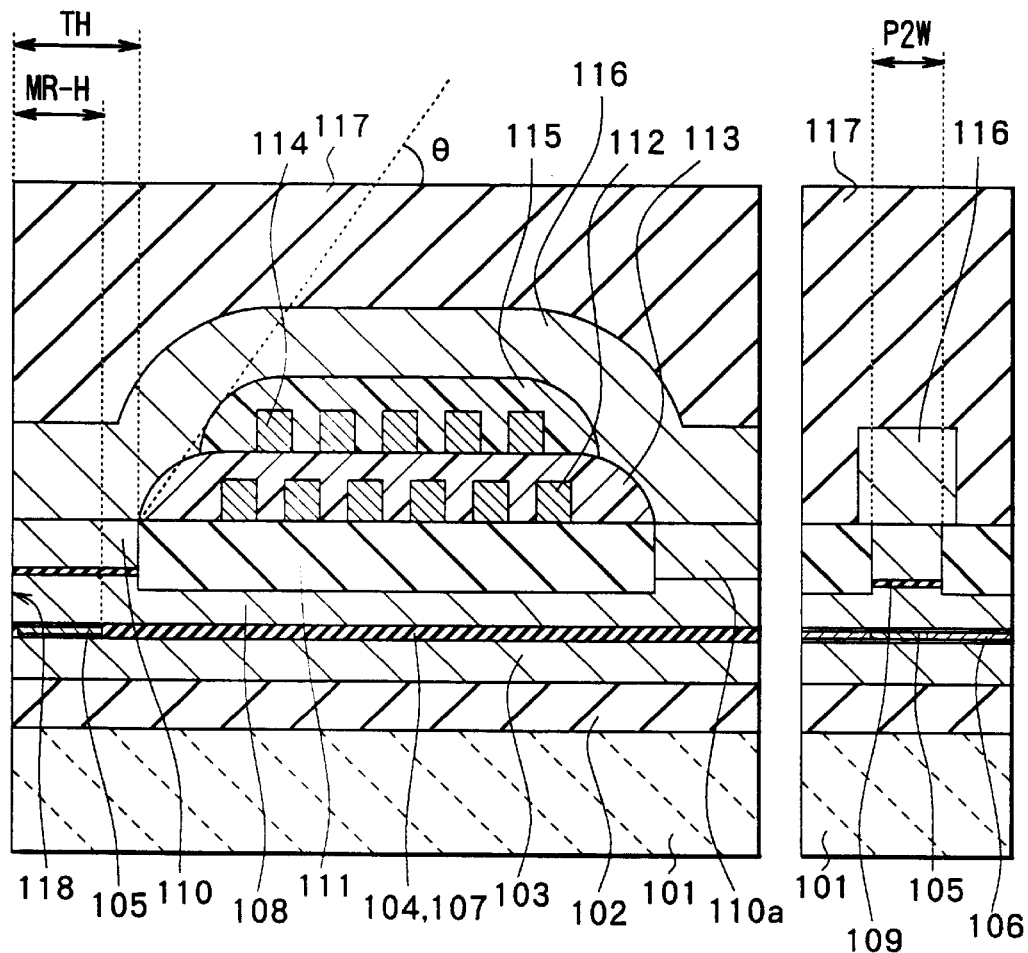
FIGS. 36A and 36B are cross sections for describing the procedure following FIG. 35.

Further, in the embodiments described above, the bottom pole tip 19a is formed to take a shape in which the sidewall is vertical to the bottom pole layer 18, however, as shown in FIG. 30, a slope surface (taper) 31 of about, for example, θ=50~70°, according to the thickness of the coil, may be provided in the sidewall. By having such a structure, saturation of the magnetic flux in the connecting portion of the bottom pole layer 18 and the bottom pole tip 19a is suppressed and flow of the magnetic flux becomes smooth.

In addition, in the embodiments described above, a case where the insulating layer 20b and the insulating layer 20d are formed with alumina, silicon dioxide or silicon nitride is described, however, after covering the thin film coil with, for example, alumina, the concave area of the surface may be buried with SOG (Spin On Glass) film and may be flattened.

Further, in the embodiments described above, the first layer of the thin film coil is buried by the insulating layer in the concave region adjacent to the bottom pole tip 19a, however, the whole concave region may be the inorganic-type insulating layer made of, for example, alumina. In the embodiments described above, a structure in which the bottom pole is made to correspond to the first magnetic layer and the top pole is made to correspond to the second magnetic layer respectively is shown, however, a structure in which, each corresponds to the other way around may also be possible. That is, a structure in which the bottom pole corresponds to the second magnetic layer and the top pole corresponds to the first magnetic layer respectively may be possible.

Further, in each embodiment described above, a manufacturing method of a composite thin film magnetic head is described. The invention may be applied to manufacturing of a thin film magnetic head for recording only, having an inductive-type transducer element for writing or of a thin film magnetic head for recording/reproducing. Further, the invention may be applied to manufacturing of a thin film magnetic head with a structure in which the order of stacking the recording element and reproducing element is reversed.

As described, according to the thin film head, or the manufacturing method of a thin film magnetic head of the invention, the first magnetic pole is formed to be divided from the first magnetic layer and to be convex shape on the first magnetic layer so that the insulating layer made of an inorganic material can be buried in the concave adjacent to the first magnetic pole. As a result, the throat height is determined by the opposite side edge frame of the track surface of the first magnetic pole, so that a pattern shift of the edge frame or deterioration of profile does not occur, unlike the photoresist film of a related art and precise control of the throat height can be achieved.

Further, by burying the thin film coil in the concave adjacent to the first magnetic pole, a step of the apex area can be lowered comparing to the structure of a related art. After that, in the procedure forming the second magnetic layer by photolithography, difference in the thickness of the photoresist film in the top and bottom of the apex area is decreased and so that micronization of the submicron measurement of the second magnetic layer can be achieved. As a result, high surface density recording by a recording head becomes possible, and performance of the recording head can be improved by stacking the coil to two layers or three layers.

Further, the second magnetic pole facing the first magnetic pole, is divided from the second magnetic layer and the second magnetic pole is formed longer than the first magnetic pole from the track surface to inside. As a result, the second magnetic pole can be micronized to the submicron measurement, while the contact area of the second magnetic pole and the second magnetic pole is increased, flow of the magnetic flux becomes smooth, precise control of the throat height can be achieved, and a thin film magnetic head with high precision can be achieved.

With the description made above, it is evident that various embodiments or modifications of the invention can be achieved. Accordingly, within the scope of the appended claims, the invention may be practiced otherwise than as specifically described.

What is claimed is:

1. A thin film magnetic head with a recording head comprising:
   a first magnetic layer having a flat surface;
   a first magnetic pole having a convex shape formed on the flat surface of the first magnetic layer and having a side that faces a recording medium;
   an insulating layer formed with inorganic materials on a side wall of the first magnetic pole opposite the side facing the recording medium and on the flat surface of the first magnetic layer, a zero-position of a throat height located at the boundary between the first magnetic pole and the insulating layer;
   a thin film coil having one layer or more, positioned in a concave region formed by the first magnetic pole and the flat surface of the magnetic layer;
   a second magnetic layer containing a second magnetic pole facing the first magnetic pole with a recording gap layer in between.

2. A thin film magnetic head according to claim 1 wherein a surface of the second magnetic layer which is on the side opposite the side facing the write gap layer is formed to be flat.

3. A thin film magnetic head according to claim 1 wherein the thin film coil is buried in a region where the insulating layers are formed, and a surface of the second magnetic layer which is on the side opposite the side facing the write gap layer, is formed to be flat.

4. A thin film magnetic head according to claim 1 or claim 2 further comprising a magnetoresistive element for reading out.

5. A thin film magnetic head according to claim 1 wherein a surface of the insulating layer which is opposite a surface adjacent to the first magnetic layer is formed to be substantially level with a surface of the first magnetic pole which is opposite of a neighboring surface of the write gap layer.

6. A thin film magnetic head according to claim 1 wherein, further, the second magnetic pole is formed being divided from the second magnetic layer, and is magnetically coupled to the second magnetic layer in, at least, part of a surface of an opposite side of a neighboring surface of the write gap layer.

7. A thin film magnetic head according to claim 6 wherein the width of the first magnetic pole along a surface facing the recording medium is formed to be wider than the width of the second magnetic pole.

8. A thin film magnetic head according to claim 6 wherein the second magnetic pole is formed to be the same length as the first magnetic pole towards inside from a surface facing the recording medium.

9. A thin film magnetic head according to claim 6 wherein the second magnetic pole faces the first magnetic pole through the write gap layer, and is formed to extend farther than the first magnetic pole from a surface facing the recording medium.

10. A thin film magnetic head according to claim 9 wherein the second magnetic pole is formed to be longer than the first magnetic pole, by a length equivalent to the film-thickness of the second magnetic pole.

11. A thin film magnetic head according to claim 6 wherein the second magnetic layer has a side close to the recording medium, the side being formed spaced apart from the side facing the recording medium.

12. A thin film magnetic head according to claim 1 further comprising a first connecting portion formed adjacent to the first magnetic layer in the vicinity of an edge of the second magnetic layer which is on the opposite side of a side facing the recording medium, and a second connecting portion formed adjacent to the second magnetic layer facing the first connecting portion, wherein the areas of the first connecting portion and the second connecting portion facing each other are different.

13. A thin film magnetic head according to claim 12 wherein an area of the second connecting portion is larger than that of the first connecting portion.

14. A thin film magnetic head according to claim 1 wherein the insulating layer includes a first insulating layer being extendedly formed from a side of the first magnetic pole opposite of the side facing the recording medium to one of a surface of the magnetic layer, and at least a second insulating layer being formed between windings of the thin film coil.

15. A thin-film magnetic head according to claim 14 wherein the whole thin-film coil is formed in the concave region.

16. A thin film magnetic head according to claim 14 wherein a surface of the thin film coil which is opposite a surface adjacent to the first insulating layer, is formed to be substantially level with a surface of the first magnetic pole adjacent to the write gap layer.

17. A thin film magnetic head according to claim 16 wherein the second insulating layer is formed to be substantially level with a surface of the first magnetic pole adjacent to the write gap layer.

18. A thin film magnetic head according to claim 17 wherein one of the surfaces of the write gap layer is formed to cover the second insulating layer and the thin film coil.

19. A thin film magnetic head according to claim 18 wherein, further, a third magnetic layer is, at least, formed extendedly from a surface of the second magnetic pole which is opposite of a side facing the recording medium to other surface of the write gap layer.

20. A thin film magnetic head according to claim 19 further comprising at least one layer of thin film coil formed being covered with other insulating layer which is different from the first to the third insulating layers, between the third insulating layer and the second magnetic layer.

21. A thin film magnetic head according to claim 20 wherein the third insulating layer and other insulating layer are formed to be substantially the same surface as a surface of the second magnetic pole which is opposite of a neighboring surface of the write gap layer.

22. A thin film magnetic head according to claim 14 wherein the first insulating layer is, further, formed along surfaces of both sides of the first magnetic pole except for an edge surface of a side facing the recording medium.

23. A thin film magnetic head according to claim 14 wherein the width of the second magnetic pole which is on the side opposite the side facing the recording medium is formed to be wider than the width of a side facing the recording medium.

24. A thin film magnetic head according to claim 1 wherein a surface of the first magnetic pole which is opposite of a side facing the recording medium inclines towards the first magnetic layer.

* * * * *